United States Patent
Ebata et al.

(10) Patent No.: US 8,411,908 B2
(45) Date of Patent: *Apr. 2, 2013

(54) IMAGING APPARATUS, CONTROL METHOD, AND RECORDING MEDIUM THEREOF

(75) Inventors: Yuya Ebata, Fujisawa (JP); Yuji Koide, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/444,259

(22) Filed: Apr. 11, 2012

(65) Prior Publication Data

US 2012/0194700 A1 Aug. 2, 2012

Related U.S. Application Data

(63) Continuation of application No. 12/326,656, filed on Dec. 2, 2008, now Pat. No. 8,170,292.

(30) Foreign Application Priority Data

Dec. 7, 2007 (JP) ................................. 2007-317336

(51) Int. Cl.
*G06K 9/00* (2006.01)
*G05B 19/18* (2006.01)

(52) U.S. Cl. ............................ 382/115; 382/274; 700/64

(58) Field of Classification Search .................. 382/100, 382/103, 106–107, 118, 154, 155, 162, 168, 382/172–173, 181, 190–195, 199–203, 209, 382/219, 224, 232, 254, 274, 276, 291, 305, 382/312, 115; 700/30, 94, 64

See application file for complete search history.

(56) References Cited

U.S. PATENT DOCUMENTS

| 7,680,299 | B2 * | 3/2010 | Hosoi ............................. 382/103 |
| 7,773,798 | B2 * | 8/2010 | Toyama et al. ................ 382/154 |
| 7,813,822 | B1 * | 10/2010 | Hoffberg ......................... 700/94 |
| 7,925,060 | B2 * | 4/2011 | Norita et al. ................... 382/118 |
| 7,974,447 | B2 * | 7/2011 | Shimano et al. ............... 382/118 |
| 7,974,714 | B2 * | 7/2011 | Hoffberg ......................... 700/94 |

FOREIGN PATENT DOCUMENTS

| JP | 2004-258764 A | 9/2004 |
| JP | 2006-165822 A | 6/2006 |
| JP | 2004-028077 A | 2/2007 |

* cited by examiner

*Primary Examiner* — Seyed Azarian
(74) *Attorney, Agent, or Firm* — Carter, DeLuca, Farrell & Schmidt LLP

(57) ABSTRACT

An imaging apparatus is provided including an imaging unit configured to obtain image data, a display unit, and a communication unit configured to communicate with a plurality of external apparatuses. The imaging apparatus further includes a storing unit configured to store person identification information including at least face image data while associating the person recognition information with information relating to the external apparatuses, a collation unit configured to collate a target in the image data with the person identification information, a detection unit configured to detect an external apparatus that is communicating with the imaging apparatus, and a display control unit configured to display a plurality of pieces of face image data on the display unit each as a candidate of a transmission destination of the image data in an order based on a result of collation by the collation unit and a result of detection by the detection unit.

27 Claims, 20 Drawing Sheets

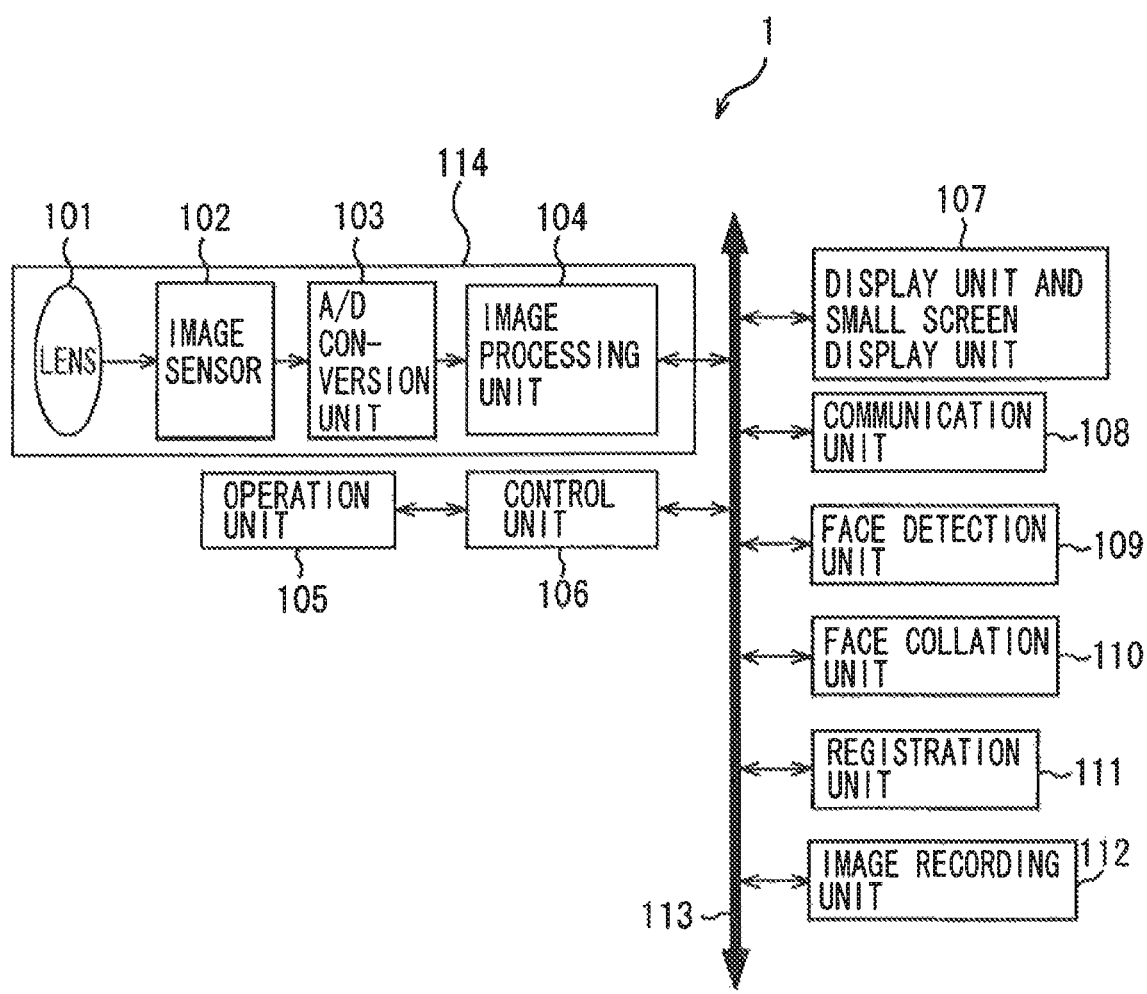

IMAGING APPARATUS, CONTROL METHOD, AND RECORDING MEDIUM THEREOF

CROSS REFERENCE TO RELATED APPLICATIONS

This application is a continuation of U.S. patent application Ser. No. 12/326,656, filed Dec. 2, 2008, which claims the benefit of Japanese Patent Application No. 2007-317336, filed Dec. 7, 2007, both of which are hereby incorporated by reference in their entirety.

BACKGROUND OP THE INVENTION

1. Field of the Invention

The present invention relates to technology for transmitting captured image data to external devices.

2. Description of the Related Art

Conventionally, there has been technology for displaying face data and personal information utilising face recognition (identification) technology, which includes comparing captured image data with characteristic points of pre-registered face data to perform face recognition (identification), and registering personal information, such as a person's name, a telephone number, and an electronic mail (e-mail) address, as a pair with the face data.

In Japanese Patent. Application Laid-Open No. 2007-28077, a piece of face data and an address are stored in advance in combination. Characteristic data acquired from captured image data is compared with the characteristic face data recorded in advance, and the matching rate is converted into a numeric value. Then, if the converted numeric value exceeds a predetermined threshold, which means a match with a high degree of accuracy, the address data associated with, the characteristic data is selected as a communication destination. Then, the selected address of the communication destination and associated thumbnail data are displayed on a liquid crystal display. Further, even in cases where two pieces of characteristic data do not match each other with a high degree of accuracy, a plurality of pieces of characteristic data having a high matching rate is extracted. Then, the address data associated with the extracted characteristic data and personal names (first names, surnames, etc.) are formed into a list for display on the liquid crystal display. Further, if the number of displays of personal names is large, all of the displays maybe displayed via scrolling.

In Japanese Patent Application Laid-Open No. 2006-165822, personal information for a person and information relating to person recognition of the person are recorded in advance. Then, the person recognition is performed on a captured image based on the information relating to the person recognition, which has been recorded in advance. As a result of the recognition, if any one of the persons recorded in advance is recognized in the captured image, the personal information of that person is read and displayed. Further, within the captured image, the personal information is superimposed, so that such information does not overlap the main portion of the person image.

However, although Japanese Patent Application Laid-Open No. 2007-28077 discusses displaying the candidates in a list, the transmission destination information (face image data) and the image to be transmitted cannot be simultaneously confirmed. Thus, the reconfirmation of the image to be transmitted requires a user's operation, which is inconvenient. Further, this technology also has a drawback that the possibility of sending an unnecessary image is increased.

Further, in Japanese Patent Application Laid-Open No. 2006-165822, personal information is only displayed on the captured image. Thus, the confirmation of the registered face image data requires a user's operation, which is inconvenient. In addition, displaying the personal information where it does not overlap the main portion of the person image may make it impossible to confirm the images of other persons. Further, since the personal information, is displayed based, on the recognition result, the incorrect personal information may be displayed due to the low recognition accuracy. If communication is started based on that information, there is a possibility of communicating with a wrong person.

SUMMARY OF THE INVENTION

The present invention is directed to providing a user interface having excellent usability in an imaging apparatus capable of selecting a transmission destination candidate for transmitting image data.

According to an aspect of the present invention, an imaging apparatus includes an imaging unit configured to obtain image data by capturing an object image including at least a target, a display unit configured to display the image data obtained by the imaging unit, a communication unit configured to be capable of communicating with a plurality of external apparatuses, a storing unit configured to store person identification information including at least face image data while associating the person identification information with information relating to the external apparatuses, a collation unit configured, to collate a target in the image data with the person identification information, a detection unit configured to detect an external apparatus that is communicating with the imaging apparatus via the communication unit, and a display control unit configured to display a plurality of pieces of the face image data on the display unit as transmission destination candidates of the image data in an order based on a result of collation by the collation unit and a result of detection by the detection unit.

According to another aspect of the present invention, a method for controlling an imaging apparatus including an imaging unit configured to obtain image data by capturing an object image including at least a target, a display unit configured to display the image data obtained by the imaging unit, and a communication unit configured to communicate with a plurality of external apparatuses, includes storing person identification information including at least face image data while associating the person identification information with information relating to the external apparatuses, collating a target in the image data, with the person identification information, detecting an external apparatus that is communicating with the imaging apparatus, and displaying a plurality of pieces of the face image data as transmission destination candidates of the image data in an order based on a result of the collation and a result of the detection.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification; illustrate exemplary embodiments, features, and aspects of the invention and, together with the description, serve to explain the principles of the invention.

FIG. 1 is a block diagram illustrating a configuration of a digital camera according to an exemplary embodiment of the present invention.

DETAILED DESCRIPTION OF THE EMBODIMENTS

Figure 2A:
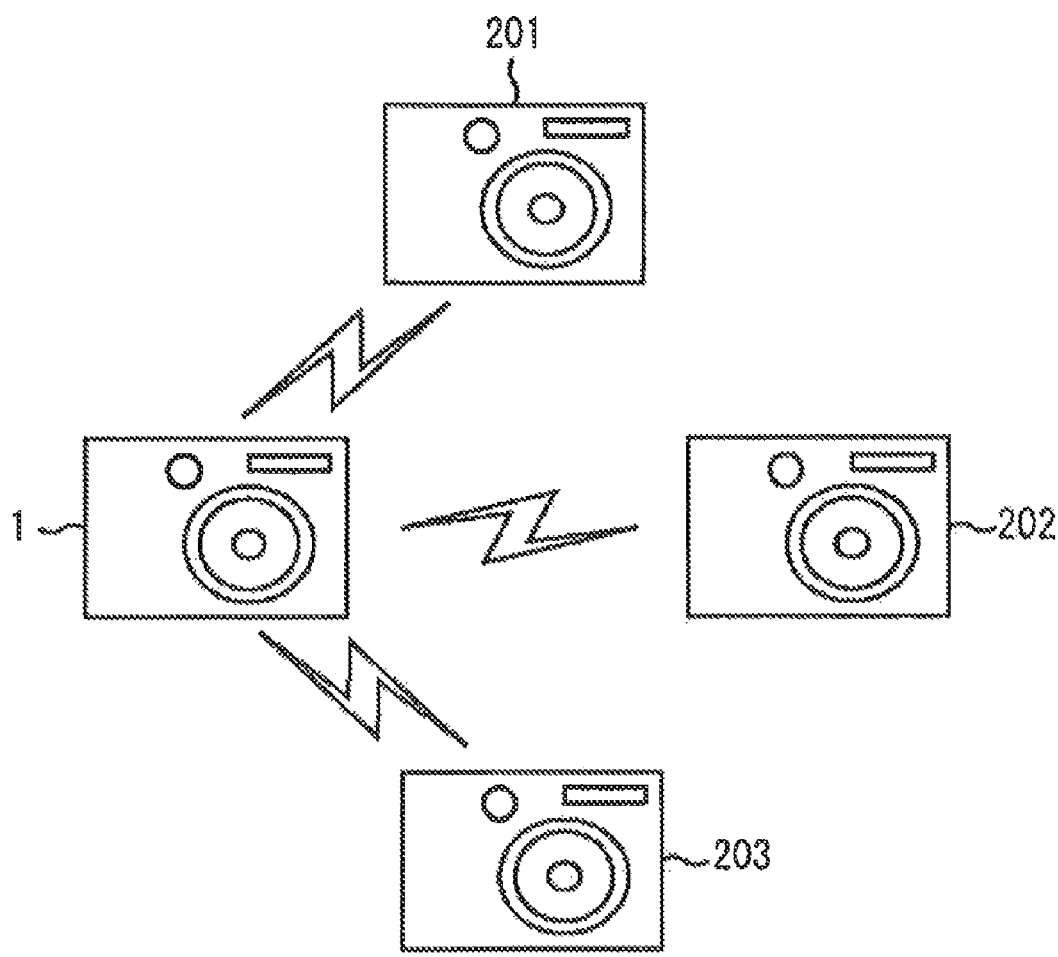
FIG. 2A is a diagram illustrating an example configuration of a network which includes the digital camera according to the exemplary embodiment of the present invention.

Various exemplary embodiments, features, and aspects of the invention will be described in detail below with reference to the drawings.

In the exemplary embodiment of the present invention, an example, in which an image captured by an imaging apparatus (a digital camera) is transmitted to another apparatus (another digital camera), will be described.

FIG. 1 is a block diagram illustrating a configuration of a digital camera 1 according to the present exemplary embodiment. The digital camera 1 includes an imaging unit 114, having a lens 101, an image sensor 102, an analog to digital (A/D) conversion unit 103, and an image processing unit 104, an operation unit 105, which is operable by a user, and a control unit 106. The digital camera 1 further includes a display unit and small screen display unit 107, a communication unit 108, a face detection unit 109, a face collation unit 110, a registration unit 111, and an image recording unit 112.

The imaging unit 114, the control unit 106, the display unit and small screen display unit 107, the communication unit 108, the face detection unit 109, the face collation unit 110, the registration unit 111, and the image recording unit 112 are interconnected via a bus 113. Further, the control unit 106 detects the state of the operation unit 105 including, for example, a power button, a shutter button, an arrow key used for some other selection operation or menu operation, and a determination button. In addition, information from the imaging unit 114, the control unit 106, the face detection unit 109, the face collation unit 110, the registration unit 111 and the image recording unit 112 is also supplied to the display unit and small screen display unit 107 via the bus 113. Each of these units will be described in more detail below.

In the imaging unit 114, the image sensor 102 configured with charge coupled device (CCD), complementary metal oxide semiconductor (CMOS), or the like, converts an optical image formed by the lens 101 into an electric signal. The A/D conversion unit 103 A/D converts image data output from the image sensor 102. The image processing unit 104 performs image processing, such as white balance and sharpness, on the A/D converted image data. Then, for example, the image processing unit 104 performs compression processing into Joint Photographic Experts Group (JPEG) format, Tagged Image File Format (TIFF) format, or the like. Further, the imaging unit 114 includes an image buffer memory (not illustrated) and the like. In the digital camera 1, a captured image can be temporarily saved in the buffer memory, and then stored in the image recording unit 112 including a recording medium such as a memory card, or transmitted to an external apparatus via the communication unit 108 controlled by the control unit 106.

The operation unit 105 includes a switch or a button, operable by a user, a user interface (UI), and the like. The operation unit 105 is used to perform operations such as power on/off, shutter release, zooming, or an operation via the UI.

The control unit 106 performs overall control of the digital camera 1 according to the present exemplary embodiment. The control unit 106 includes a central processing unit (CPU), a read-only memory (ROM) for storing a control program executable by the CPU, and a random access memory (RAM) for temporarily storing various types oil data during execution of the control processing by the CPU. In response to a trigger generated by a user's operation, for example, a shutter release operation, input from the operation unit 105, the control unit 106 performs the processing of image capturing by the imaging unit 114, recording of the captured image data into the image recording unit 112, outputting by wired or wireless communication, power monitoring, face detection, and registration of face identification information and transmission destinations.

The display unit and small screen, display unit 107 has an electronic finder function, a menu settings display function, a captured image display function, and a small screen display function, for displaying transmission destination candidates when transmitting an image to another digital camera. The display unit and small screen display unit 107 displays images or the like on a liquid crystal panel.

The communication unit 108 has a wired or wireless communication function. According to an instruction from the control unit 106, the communication, unit 108 establishes communication connection with another apparatus to transmit/receive images, device information about other apparatuses, face image data, and the like.

The face detection unit 109 detects a face of a person in a live display during image capturing and in the display of a captured image. The face collation unit 110 performs determination on face collation based on the face image data registered in the registration unit ill with respect to the captured image.

The registration unit 111 registers device information of another communication party in advance for transmitting/receiving image data and device information. Here, device information includes, for example, an IP address of another apparatus, wireless parameters required for wireless connection with another apparatus, a device ID for specifying another apparatus, and face image data as identification information associated with such information. The registration unit 111 is also configured to be capable of associating face image data, acquired from another apparatus via the communication unit 108, with a certain piece of information, and capable of registering them. The image recording unit 112 records the image data from the imaging unit 114 or image data, which is received by the communication unit 108, on a recording medium.

FIG. 2 A illustrates an example of a wireless network configured by the digital camera 1 according to the present exemplary embodiment and an external apparatus. In the present exemplary embodiment, a wireless network is configured by wirelessly connecting the digital camera 1 as an imaging apparatus, with digital cameras 201, 202, and 203 as other apparatuses. Each of the digital cameras 201, 202, and 203 has a similar configuration as that illustrated in FIG. 1. In such a wireless network, these devices included in the network have wireless connection information of the other devices stored in a memory, and based on that information the connection between the devices is performed.

Figure 2B:
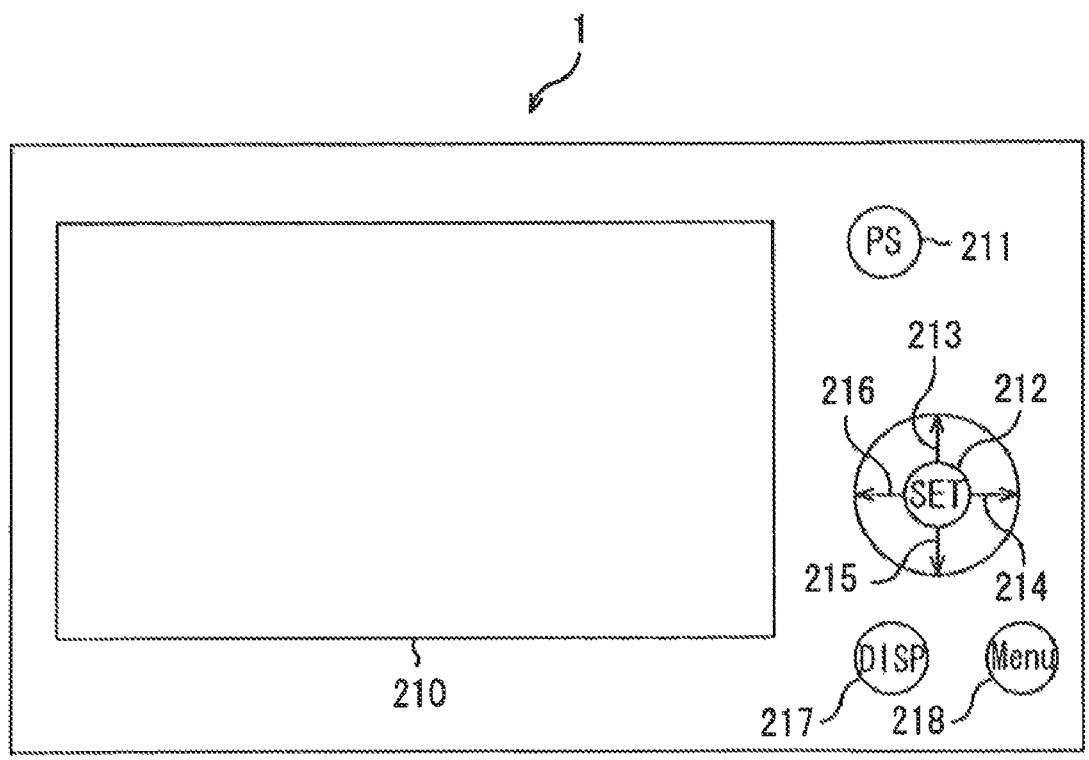
FIG. 2B is a rear view of the digital camera according to the exemplary embodiment of the present invention.

FIG. 2B is a rear view of the digital camera 1 according to the present exemplary embodiment. The digital camera 1 includes a display unit 210 including a liquid crystal display and the like on its rear face. The digital camera 1 displays images, etc., on the display unit 210. The digital camera 1 also includes a plurality of operation, units to be operated by a user. More specifically, the digital camera 1 includes a PS button 211, a SET button 212, an up key 213, a right, key 214, a down key 215, and a left key 216 (hereinafter, sometimes collectively referred to as up/down left/right keys 213, 214, 215, and 216). The digital camera 1 also includes a DISP button 217 and a MENU button 218.

Figure 3:
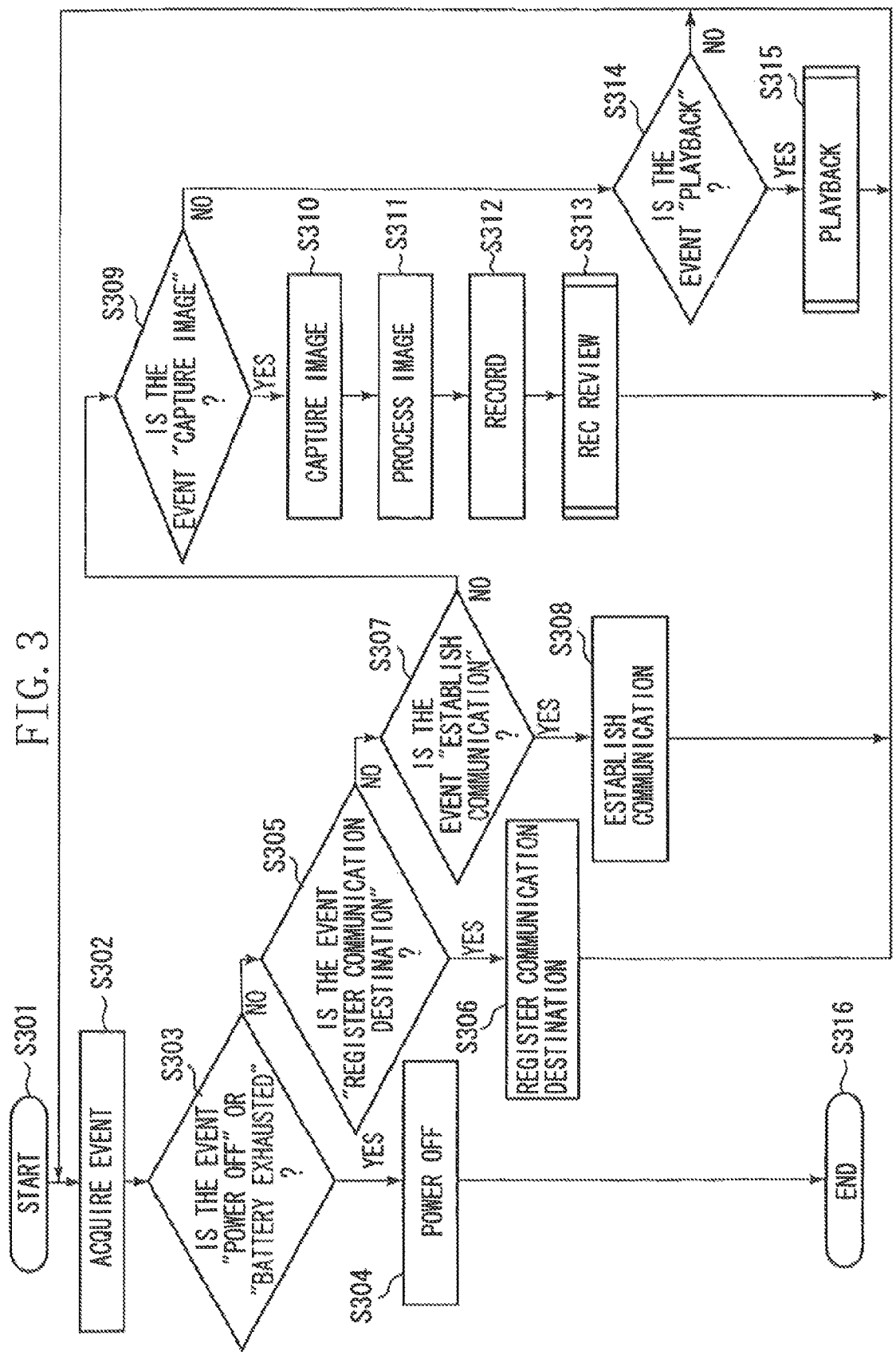
FIG. 3 is a flowchart illustrating operations of the digital camera according to the exemplary embodiment of the present invention.

Next, the operations executed by the digital camera 1 according to the present exemplary embodiment will be described below. FIG. 3 is a flowchart illustrating operations executed by the digital camera 1 after its start-up. More specifically, FIG. 3 is a flowchart in which image capture processing, playback display processing of the captured image, registration processing of communication destination, communication establishment processing with another device, and power OFF processing are executed in response to a user's operation.

Once the power is turned on and the digital camera 1 is started up in step S301, first, in step S302, the control unit 106 of the digital camera 1 acquires an event, and the processing proceeds to step S303.

In step S303, the control unit 106 determines whether the event acquired in step S302 is the "power OFF" or "battery exhausted" event. If the event is the "power OFF" or "battery exhausted" event (YES in step S303), the processing proceeds to step S304. Otherwise (NO in step S303), the processing proceeds to step S305.

In step S305, the control unit 106 determines whether the event acquired in step S302 is a "register communication destination" event. If the event is the "register communication destination" event (YES in step S305), the processing proceeds to step S306. Otherwise (NO in step S305), the processing proceeds to step S307.

In step S307, the control, unit 106 determines whether the event acquired in step S302 is the "establish communication" event. If the event is the "establish communication" event (YES in step S307), the processing proceeds to step S308. Otherwise (NO in step S307), the processing proceeds to step S309.

In step S309, the control unit 106 determines whether the event acquired in step S302 is a "capture image" event. If the event is the "capture image" event (YES in step S309), then the processing proceeds to step S310. Otherwise (NO in step S309), the processing proceeds to step S314.

In step S314, the control unit 106 determines whether the event acquired in step S302 is a "playback" event. If the event is the "playback" event (YES in step S314), the processing proceeds to step S315. Otherwise (NO in step S314), the processing returns to step S302, and the control unit 106 acquires an event again.

If it is determined in step S303 that the event is the "power OFF" or "battery exhausted" event (YES in step S303), the control unit 106 turns the power of the digital camera 1 OFF by executing power OFF processing in step S304, and finishes the processing in step S316.

Further, if it is determined in step S305 that the event is the "register communication destination" event (YES in step S305), the control unit 106 executes communication destination registration processing in step S306. In communication destination registration processing, information on other devices for establishing communication and face image data are registered. Examples of the face image data to be registered include data on the owners of the other devices, and data on the family of the owner. Further, the registration can be performed by acquiring face image data from the other devices and associating the data with the information on other devices that is registered in the registration unit 111. After the processing of step S306, the processing returns to step S302, and the control unit 106 acquires an event again.

Further, if it is determined in step S307 that the event is the "establish communication" event (YES in step S307), in step S308, the control unit 106 executes establish, communication processing. In the establish communication processing, processing such as receiving a connection request from an external apparatus, and communication connection if the external apparatus is already registered in the registration unit 111, and not connecting if the external apparatus is not already registered, is performed. After the processing of step S308, the processing returns to step S302, and the control unit 106 acquires an event again, Further, if it is determined in step S309 that the event is the "capture image" event (YES in step S309), in step S310, the control unit 106 first performs imaging processing. The imaging processing includes controlling of the various sensors that measure the brightness of the object, the object distance and the like to capture an image.

Next, in step S311, the control unit 106 performs image processing. In the image processing, signal processing of the image such as white balance processing and sharpness processing is performed. Then, for example, compression processing into JPEG format, TIFF format or the like is performed.

Next, in step S312, the control unit 106 performs record processing. In the record, processing, image data is recorded on an external recording medium.

Next, in step S313, the control unit 106 executes RFC review processing. Here, the REC review processing will be described below using the flowchart of FIG. 12, Once the REC review processing is started in step S1201, first, in step S1202, the control unit 106 displays on the display unit 210 illustrated in FIG. 2B an image immediately after it is captured, and the processing proceeds to step S1203.

In step S1203, the control unit 106 acquires an event. Next, in step S1204, the control unit 106 determines whether the acquired event is a "display transmission screen" event. Examples of the events acquired in step S1203 include the "display transmission screen" event instructed through the SET button 212 illustrated in FIG. 9, and a "timeout" event concerning the captured image display time according to the set value and the like.

If it is determined in step S1204 that the event acquired in step S1203 is the "display transmission screen" event (YES in step S1204), in step S1206, the control unit 106 performs display transmission screen processing. The details of the display transmission screen processing will foe described below using the flowchart of FIG. 4. After the display transmission screen processing in step S1206, the proceeding returns to step S1203 to acquire an event.

On the other hand, if it is determined in step S1204 that, the event acquired, in step S1203 is the "timeout" event (NO in step S1204), in step S1205, the control unit 106 stops displaying the played back image. Then, the control unit 106 finishes the REC review processing in step S1207. The processing then returns to step S302 of FIG. 3, and the control unit 106 acquires an event again.

Returning to FIG. 3, if it is determined in step S314 that the event is the "playback" event (YES in step S314), in step S315, the control unit 106 executes playback processing. Here, the playback processing of step S315 will be described using the flowchart of FIG. 13.

Once the playback processing is started in step S1301, first, in step S1302, the control unit 106 displays on the display unit 210 illustrated in FIG. 2B the image recorded in the image recording unit 112. More specifically, typical single-image playback or thumbnail playback, in which a plurality of pieces of image data are displayed, is performed.

Next, in step S1303, the control unit 106 acquires an event. Examples of the events acquired here include the "display transmission screen" event, instructed through the SET button 212 illustrated in FIG. 2B, a "cancel playback" event instructed through the DISP button 217, and a "move to next image" event instructed through the up/down left/right keys 213, 214, 215, and 216. If the playback image is only a single image, the "move to next image" event does not occur even if the up/down left/right keys 213, 214, 215, and 216 are operated.

Next, in step S1304, the control unit 106 determines whether the event acquired in step S1303 Is the "cancel playback" event. If the event is the "cancel playback" event (YES in step S1304), the processing proceeds to step S1305. Otherwise (NO in step S1304), the processing proceeds to step S1306.

In step S1306, the control unit 106 determines whether the event acquired in step S1303 is the "display transmission screen" event. If the event is the "display transmission screen" event (YES in step S1306), the processing proceeds to step S1307. Otherwise (NO in step S1306), the processing proceeds to step S1308.

In step S1308, the control unit 106 determines whether the event acquired in step S1303 is a "move to next image" event. If the event is a "move to next image" event (YES in step S1308), the processing proceeds to step S1309. Otherwise (NO in step S1308), the processing returns to step S1303, and the control unit 106 acquires an event again.

On the other hand, if it is determined in step S1304 that the event is the "cancel playback" event (YES in step S1304), in step S1305, the control unit 106 stops displaying the played back image, and finishes the playback processing in step S1310.

Further, if it is determined in step S1306 that the event is the "display transmission screen" event (YES in step S1306), in step S1307, the control unit 106 performs a display transmission screen processing. Then, the processing returns to step S1303, and the control unit 106 acquires an event again. The details of the display transmission screen processing will be described below using the flowchart of FIG. 4.

Further, if it is determined in step S1308 that the event is a "move to next image" event (YES in step S1308), in step S1309, the control unit 106 moves the played back image to the next image and displays the captured image in step S1302. Then, in step S1303, the control unit 106 acquires an event again.

Figure 12:
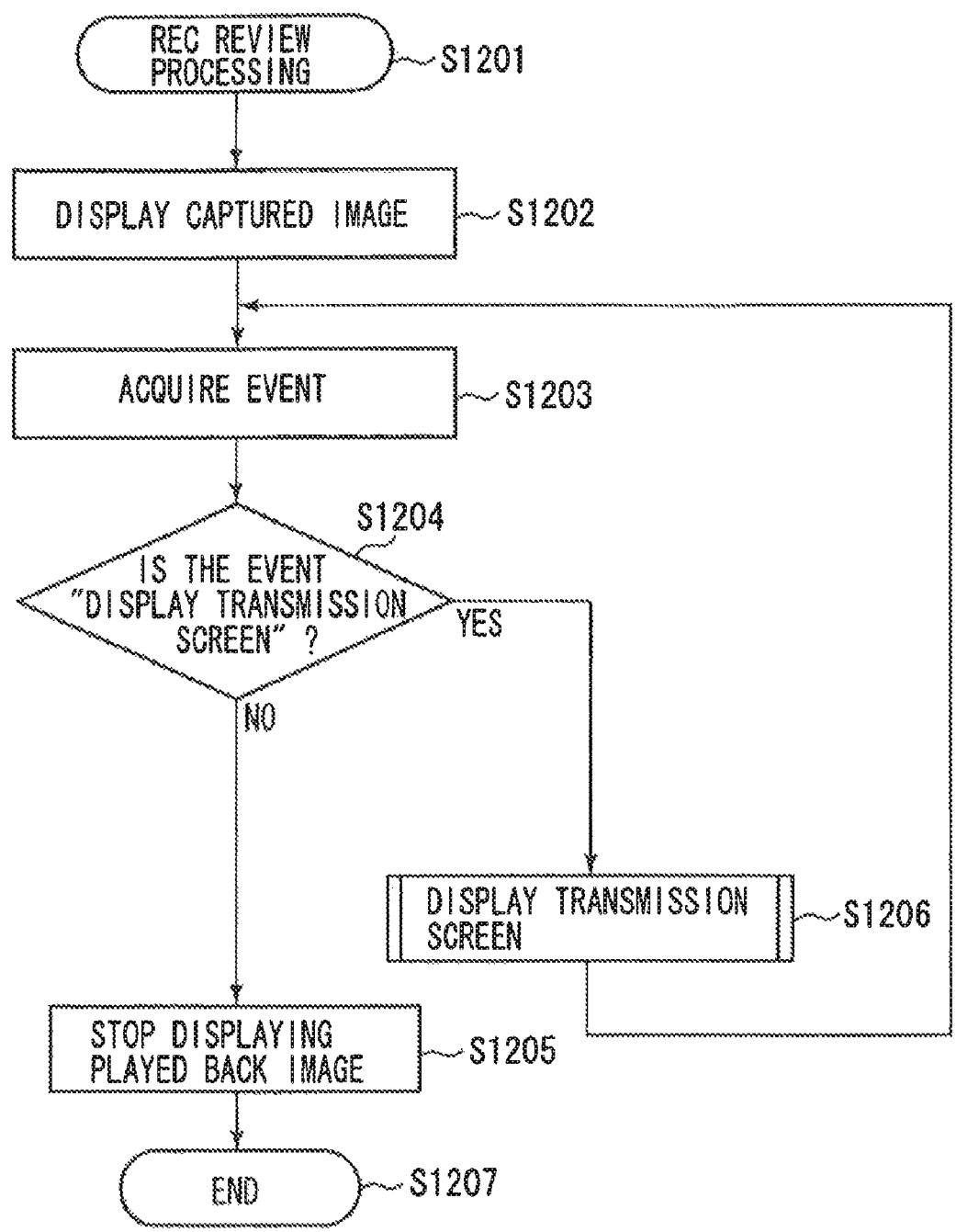
FIG. 12 is a flowchart illustrating REC review processing of the digital camera according to the exemplary embodiment of the present invention.
Figure 13:
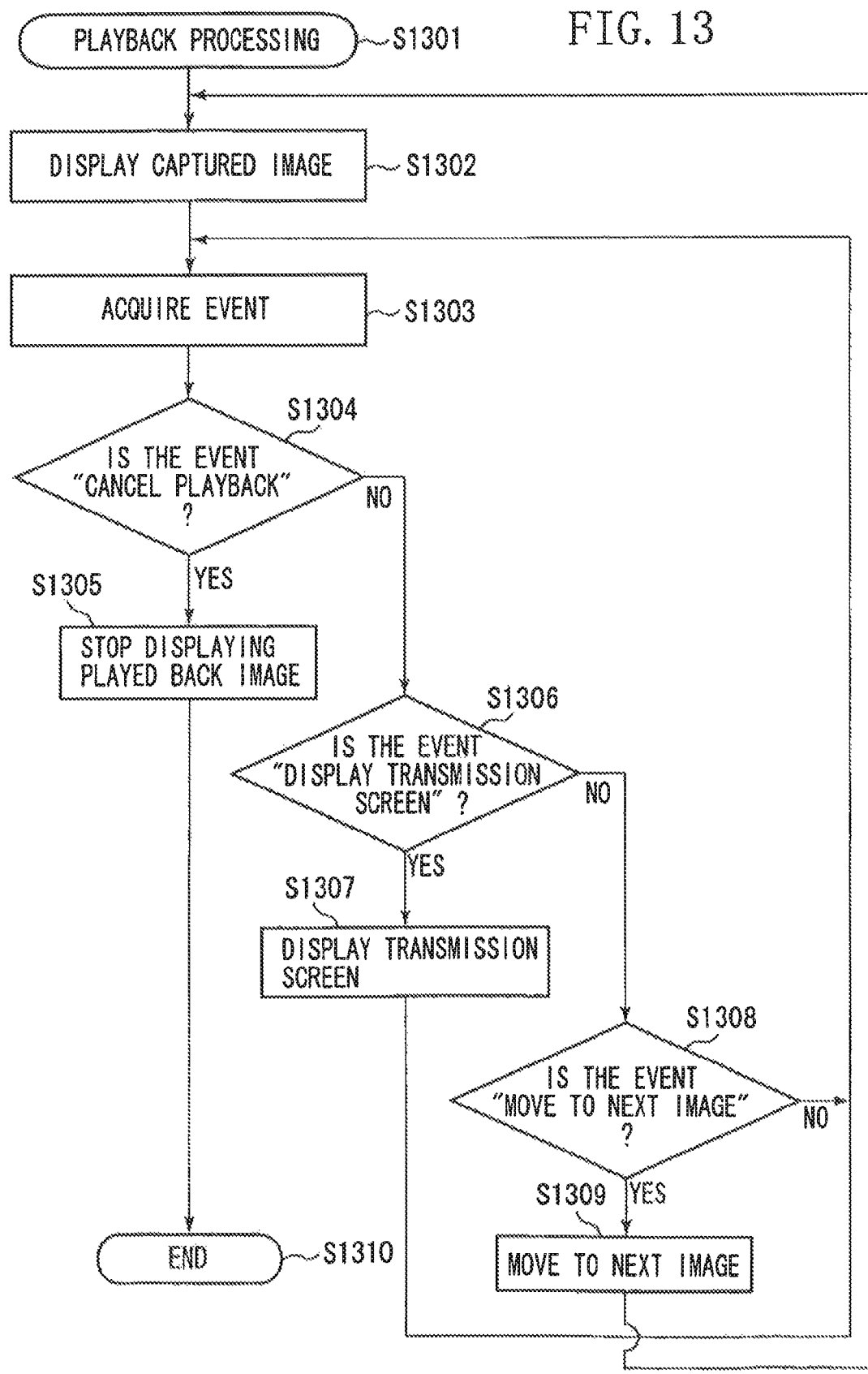
FIG. 13 is a flowchart illustrating the playback processing of the digital camera according to the exemplary embodiment of the present invention.

Here, the details of the display transmission screen processing in step S1206 of FIG. 12, and step S1307 of FIG. 13 will be described using FIGS. 4 to 11, and 14 to 21.

Figure 4:
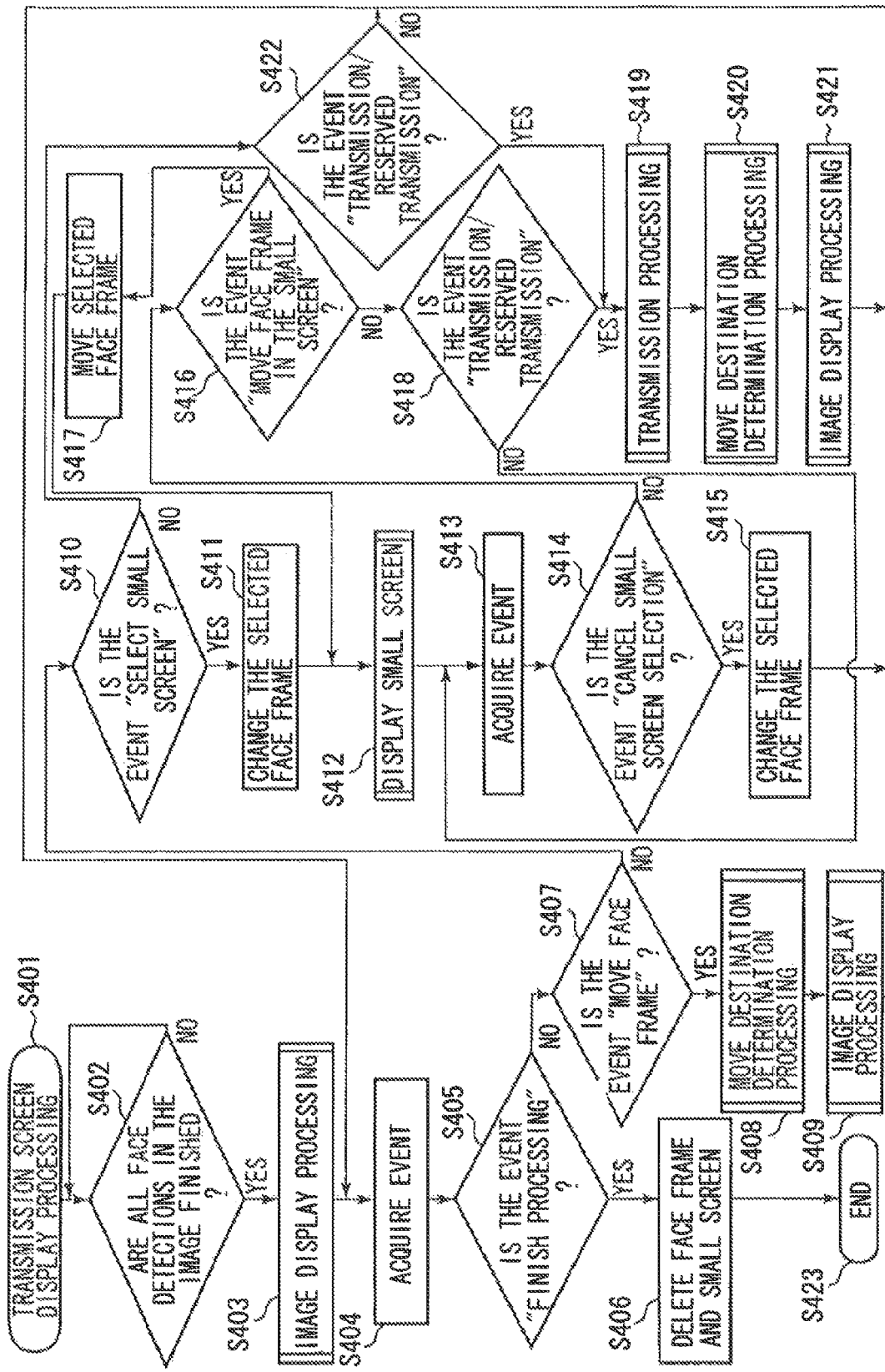
FIG. 4 is a flowchart illustrating transmission screen display processing of the digital camera according to the exemplary embodiment of the present invention.
Figure 5:
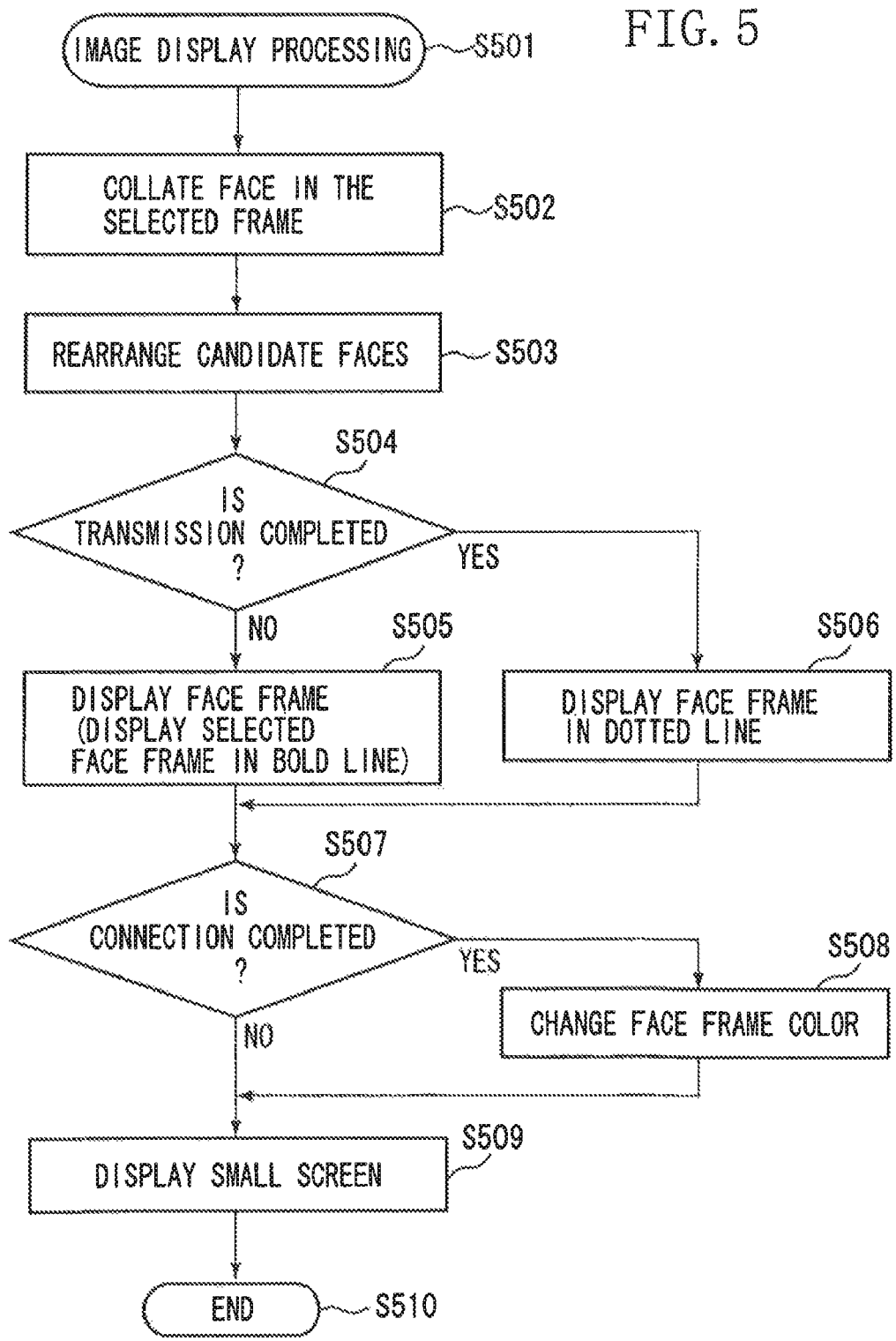
FIG. 5 is a flowchart illustrating screen display processing of the digital camera according to the exemplary embodiment of the present invention.

FIG. 4 is a flowchart illustrating the details of the display transmission screen processing.

Once the display transmission screen processing is started in step S401, first, in step S402, the control unit 106 detects faces in the image displayed in the playback. Here, the processing is repeated until all of the faces are detected. Once all of the faces in the image have been detected (YES in step S402), the processing proceeds to the image display processing of step S403.

Figure 9:
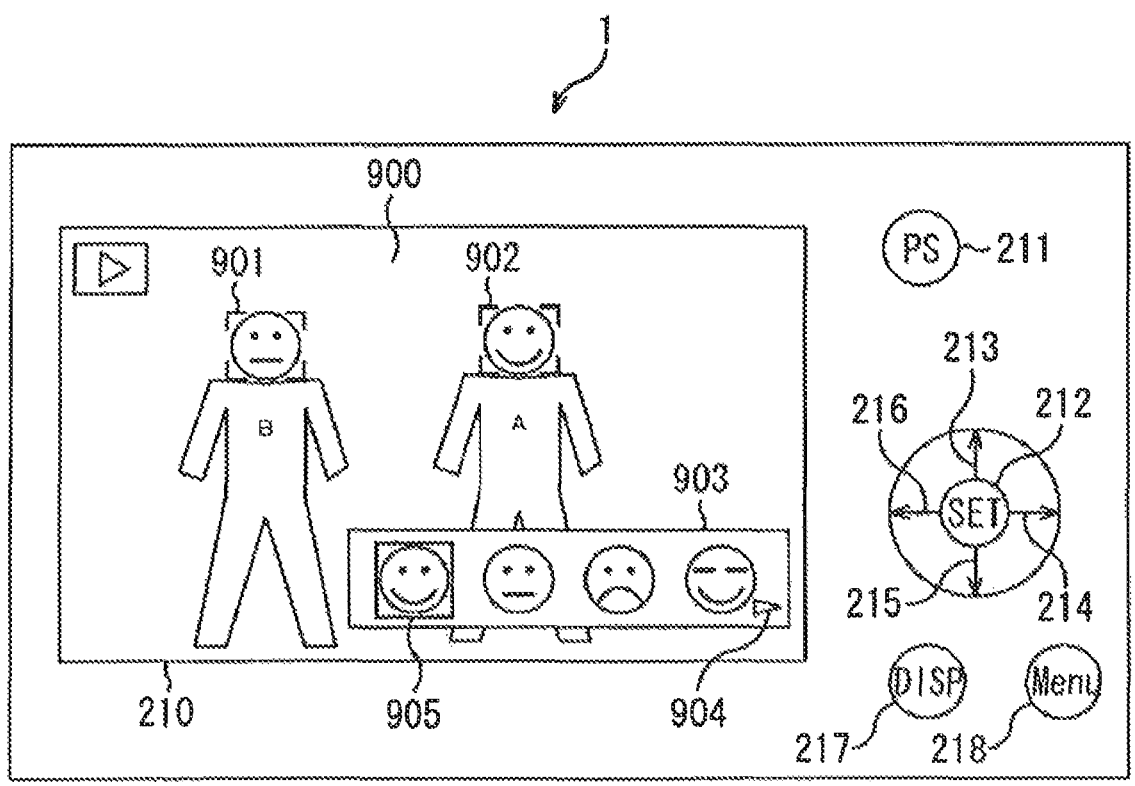
FIG. 9 is a diagram illustrating the rear face and the screen display during the transmission screen display processing of the digital camera according to the exemplary embodiment of the present invention.

In step S403, the control unit 106 displays an image like that illustrated in FIG. 9 on the display unit 210. The details of the image display processing will be described below using the flowchart of FIG. 5.

FIG. 9 will now be described. FIG. 9 is a rear view of the digital camera 1. In FIG. 9, an image 900 is displayed according to the display transmission screen processing on the display unit 210. In the image 900, face frames 901 and 902 are displayed around the faces in the image 900, which is detected in the face detection processing of step S402 in FIG. 4. Here, the face regions, on which the face frames 901 and 902 are displayed, can be selected by operating the up/down left/right keys 213, 214, 215, and 216 to move a cursor. The face frame 902, which is displayed in bold line, indicates that this face frame is currently selected by the cursor. This small screen 903 is a region that displays a candidate list of the face images in order of increasing similarity. The list is made by comparing the faces, which are detected in the face detection processing of step S402, with registered face image data. A display 904 is used to notify a user of the presence of the next candidate when not all of the face image candidates for the faces detected in step S402 can be displayed in the small screen 903. In the present exemplary embodiment, though an arrow mark is displayed, for example, when not all of the face image candidates can be displayed, any other means can be employed. Examples of other means include providing a unit which notifies when not all the face image candidates can be displayed and a unit which can reference the face image candidates that could not be displayed. Further, a face frame 905 is displayed in the small screen 903 to indicate the selected face.

Returning to FIG. 4, once, display of the image has been finished in the image display processing of step S403, in step S404, the control unit 106 acquires an event, and the processing proceeds to step S405. Examples of the event acquired in step S404 include a move (select) face frame event of the face frames 901 and 902 instructed through the up/down left/right keys 213, 214, 215, and 216, a selection event of the selected frame in the small screen 903 instructed through the SET button 212, a finish processing event instructed through the DIS button 217, and a transmission/reserved transmission event instructed through the MENU button 218.

In step S405, the control unit 106 determines whether the event acquired in step S404 is a "finish processing" event. If the event is the "finish processing" event (YES in step S405), the processing proceeds to step S406. Otherwise (NO in step S405), the processing proceeds to step S407.

In step S407, the control unit 106 determines whether the event acquired in step S404 is a "move face frame" event. If the event is the "move face frame" event (YES in step S407), the processing proceeds to step S408. Otherwise (NO in step S407), the processing proceeds to step S410.

In step S410, the control unit 106 determines whether the event acquired in step S404 is a "select small screen" event. If the event is the "select small screen" event (YES in step S410), the processing proceeds to step S411. Otherwise (NO in step S410), the processing proceeds to step S422.

In step S422, the control unit 106 determines whether the event acquired in step S404 is the "transmission/reserved, transmission" event. If the event is the "transmission/reserved transmission" event (YES in step S422), the processing proceeds to step S410. Otherwise (NO in step S422), the processing returns to step S404, and the control unit 106 acquires an event again.

Figure 15:
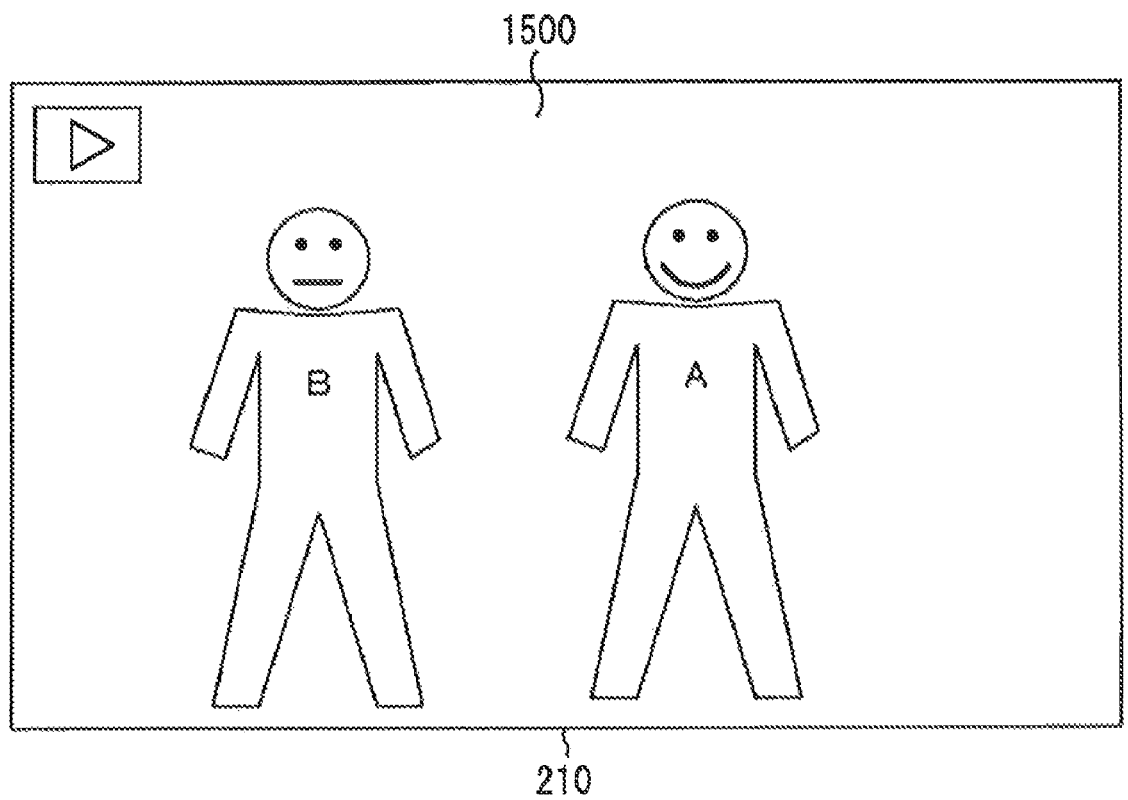
FIG. 15 is a diagram illustrating the screen display during playback or the REC review of the digital camera according to the exemplary embodiment of the present invention.

If it is determined in step S405 that the event is the "finish processing" event (YES in step S405), in step S406, the control unit 106 executes delete face frame and small screen processing. In delete face frame and small screen processing, according to FIG. 9, the face frames 901 and 902 and the small screen 903 are deleted. Once the delete face frame and small screen, processing is finished in step S406, in step S423, the control unit 106 finishes the display transmission screen processing, and an image 1500 illustrated in FIG. 15 is displayed on one display unit 210.

Figure 14:
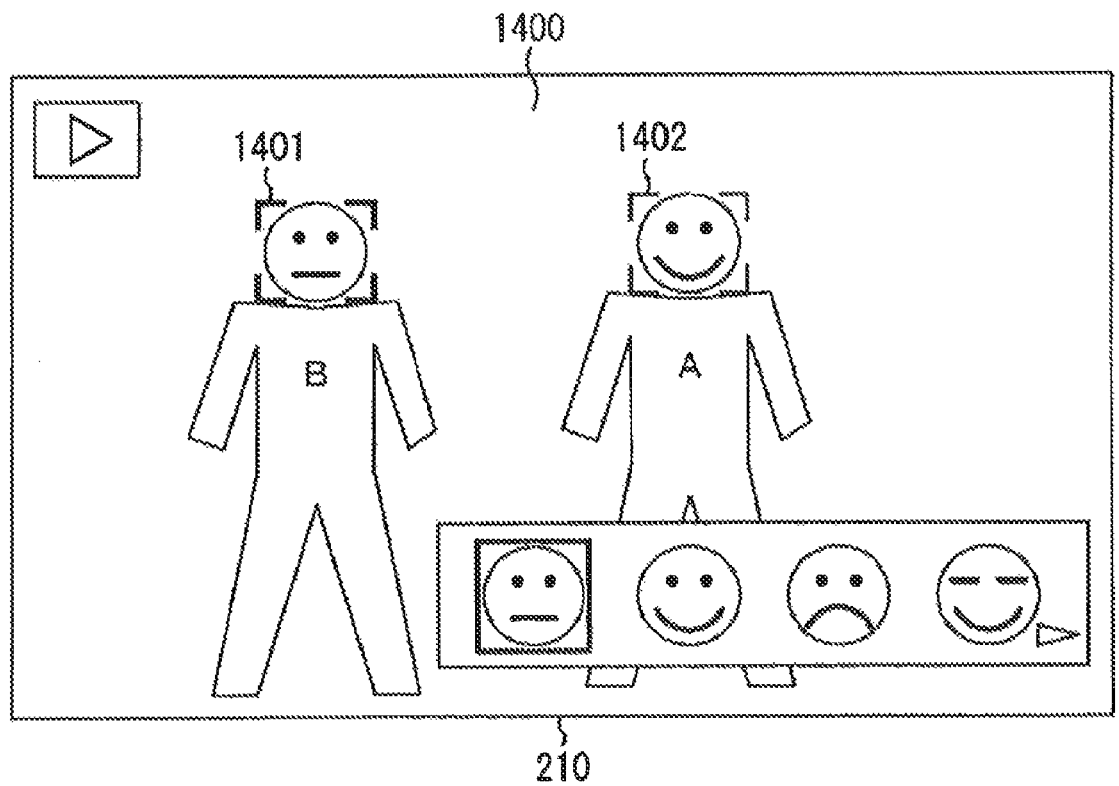
FIG. 14 is a diagram illustrating the screen display when a face frame of the digital camera is moved according to the exemplary embodiment of the present invention.

Further, if it is determined in step S407 that the event is the "move face frame" event (YES in step S407), in step S408, the control unit 106 executes move destination determination processing. The details of the move destination determination processing of step S408 will be described below using the flowchart of FIG. 7. Once the move destination determination processing is finished in step S408, in step S409, the control unit 106 executes image display processing, and then performs the event, acquisition of step S404 again. The details of the image display processing of step S409 will be described below using the flowchart of FIG. 5. Further, if the move destination determination processing of step S408 is performed and then the image display processing of step S409 is performed, according to FIG. 9, this means that the selected face frame switches in FIG. 9 from the face frame display 902 to the face frame 901. That is, the state is switched from the state of the image 900 illustrated in FIG. 9 to the state of image 1400 illustrated in FIG. 14. In FIG. 14, the face frame 1401 is currently selected, which is displayed in bold line on the display unit 210 and the face frame 1402 is not selected.

Figure 16:
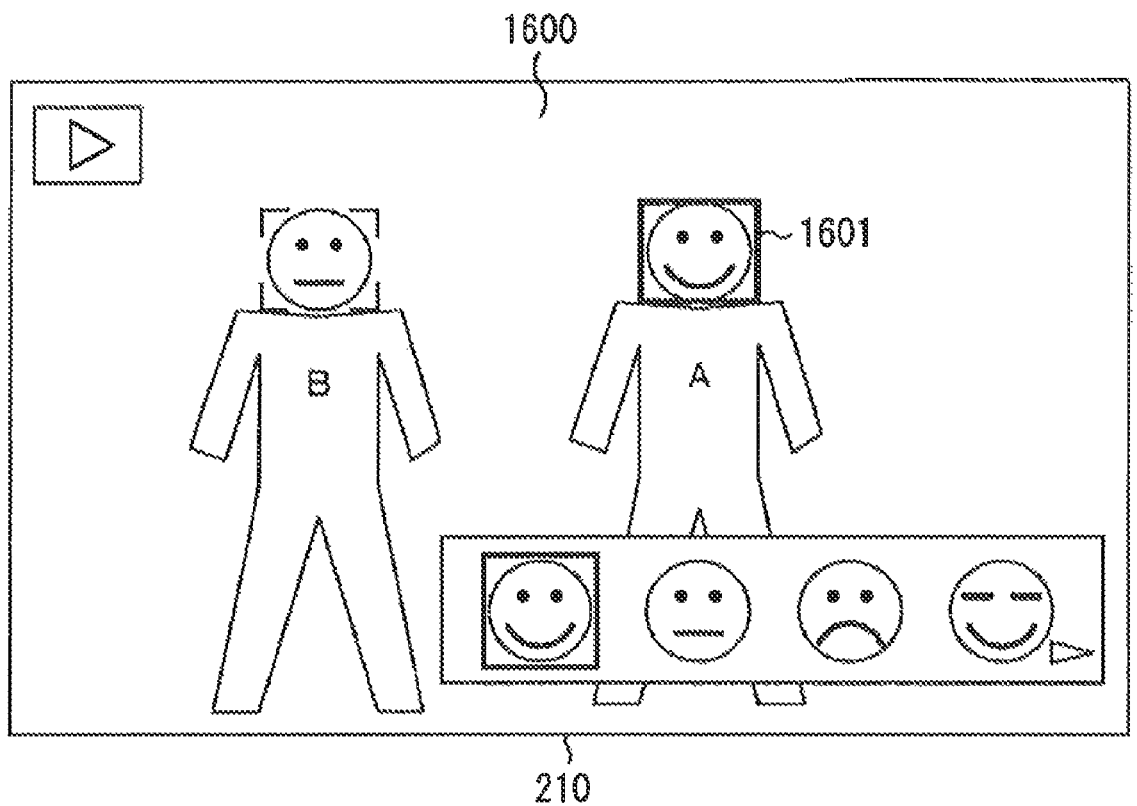
FIG. 16 is a diagram illustrating the screen display when a face image in a small screen of the digital camera is selected according to the exemplary embodiment of the present invention.

Further, if it is determined in step S410 that the event is the "select small screen" event (YES in step S410), in step S411, the control unit 106 executes change the selected face frame processing. For example, this processing changes the selected face frame of the image data from "four-cornered surround frame of face" to "surround frame of face", so that an image 1600 illustrated in FIG. 16 is displayed, on the display unit 210. The face frame display 1601 surrounding the face in FIG. 16 corresponds to the "four-cornered surround of face" face frame 902 of FIG. 9. In addition, the processing of this step S411 means that the selection of the face detected, in the image has been completed.

In step S412, the control unit 106 executes small screen display processing, and then in step S413 acquires an event. The details of the small screen display processing of step S412 will be described below using the flowchart of FIG. 8. In addition, examples of the events acquired in step S413 include a "cancel small screen selection" event instructed through the DISP button 217, the "transmission/reserved transmission" event instructed through the PS button 211, and a "move face frame in the small screen" event instructed through the right key 214 and the left, key 216.

After the event acquisition in step S413, in step S414, the control unit 106 determines whether the event acquired in step S413 is the "cancel small screen selection" event. If the event is the "cancel small screen selection" event (YES in step S414), the processing proceeds to step S415. Otherwise (NO in step S414), the processing proceeds to step S416.

In step S416, the control unit 106 determines whether the event acquired in step S413 is the "move face frame in the small screen" event. If the event is the "move face frame in the small screen" event (YES in step S416), the processing proceeds to step S417. Otherwise (NO in step S416), the processing proceeds to step S418.

In step S418, the control unit 106 determines whether the event acquired in step S413 is the "transmission/reserved transmission" event, If the event is the "transmission/reserved transmission" event (YES in step S418), then the processing-proceeds to step S419. Otherwise (NO in step S418), then the processing returns to step S413, and the control unit 106 acquires an event again.

If it is determined in step S414 that the event is the "cancel small screen selection" event (YES in step S414), in step S415, the control unit 106 changes the selected face frame from, "surround frame of face" to "four-cornered surround frame of face", and displays the. image on the display unit 210. The processing then returns to step S404, and the control unit 106 acquires an event again. In addition, the processing of this step S415 means that the selection of the face detected in the image is canceled.

Figure 17:
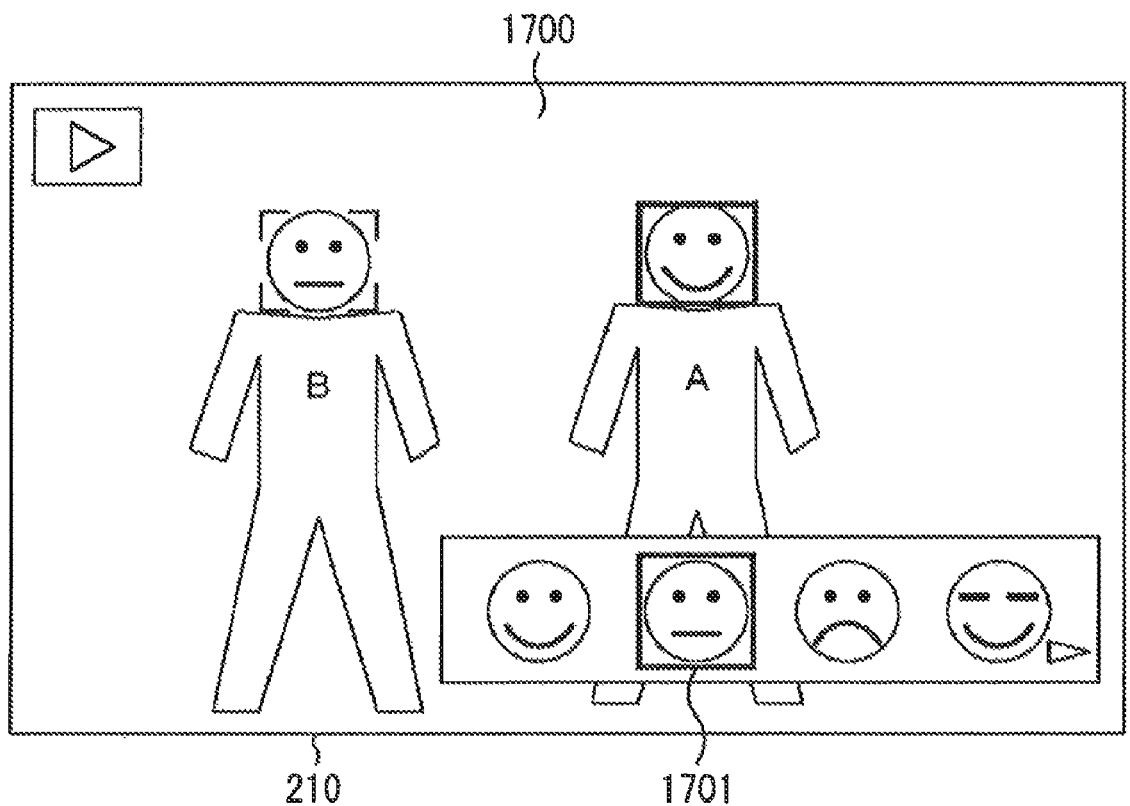
FIG. 17 is a diagram illustrating the screen display when the selected frame in the small screen of the digital camera is moved according to the exemplary embodiment of the present invention.

Further, if it is determined in step S416 that the event is the "move face frame in the small screen" event (YES in step S416), in step S417, the control unit 106 moves the selected frame in the small screen, and executes the small screen display processing of step S412. For example, if the image 1600 illustrated in FIG. 16 is being displayed, by an operation, of the right key 214, the image 1700 illustrated in FIG. 17 is displayed on the display unit 210, so that the selected face frame changes to the selected frame 1701.

Figure 18A:
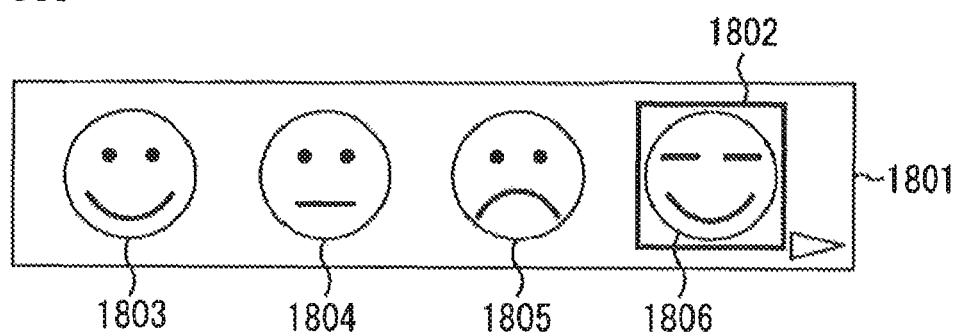
FIGS. 18A to 18C are diagrams illustrating the display in the small screen when the selected frame in the small screen of the digital camera is moved according to the exemplary embodiment of the present invention.
Figure 18B:
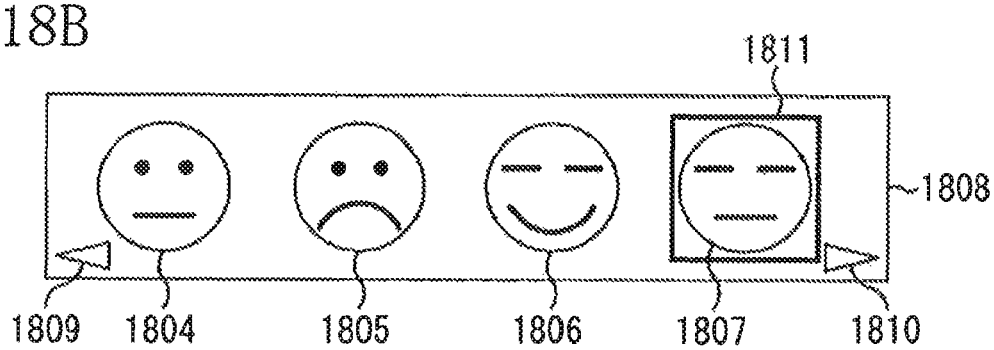
Figure 18C:
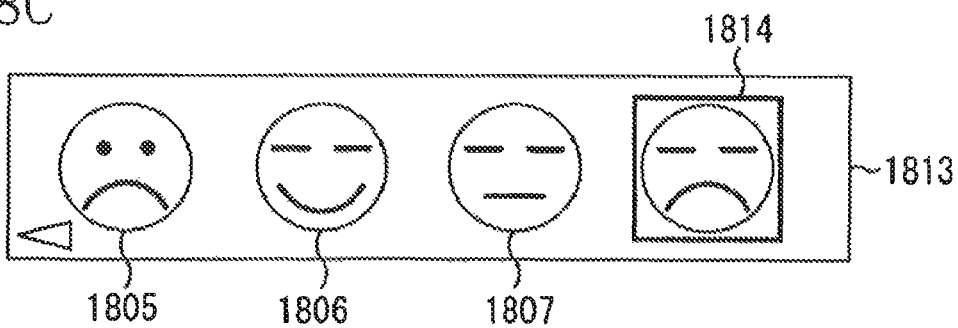

Here, FIGS. 18A to 18C illustrate movement examples of the selected face in the small screen, or in other words, movement examples of the selected frame. In FIG. 18A, the small screen 1801 illustrates a list of the currently displayed face image candidates, and a selected frame 1802 indicates that a face image 1806 is selected. In this state, if the right key 214 is operated, as illustrated in FIG. 18B, the display of the face image 1803 disappears, the face images 1804, 1805, and 1806 are shifted to the left, a face image 1807 is newly displayed, and a new small screen 1808 is displayed. An arrow 1809 indicates that a displayable face image exists if the left key 216 is operated. An arrow 1810 similarly indicates that a displayable face image exists if the right key 214 is operated. In addition, a frame 1811 denotes that it is the currently selected frame. Further, when the small screen 1808 is displayed, if the right key 214 is operated, as illustrated, in FIG. 18C, a new small screen 1813 is displayed, in which case a frame 1814 denotes that it is the currently selected frame. The left and right arrow marks (1809, 1810 etc.) are not displayed when there are no images to be displayed by operation of the right key 214 or left key 216. That is, in the small screen 1801, since there are no face images to be displayed by the operation of the left key 216, the left arrow mark is not displayed, while in the small screen 1813, since there are no face images to be displayed by the operation of the right key 214, the right arrow mark is not displayed.

Figure 10:
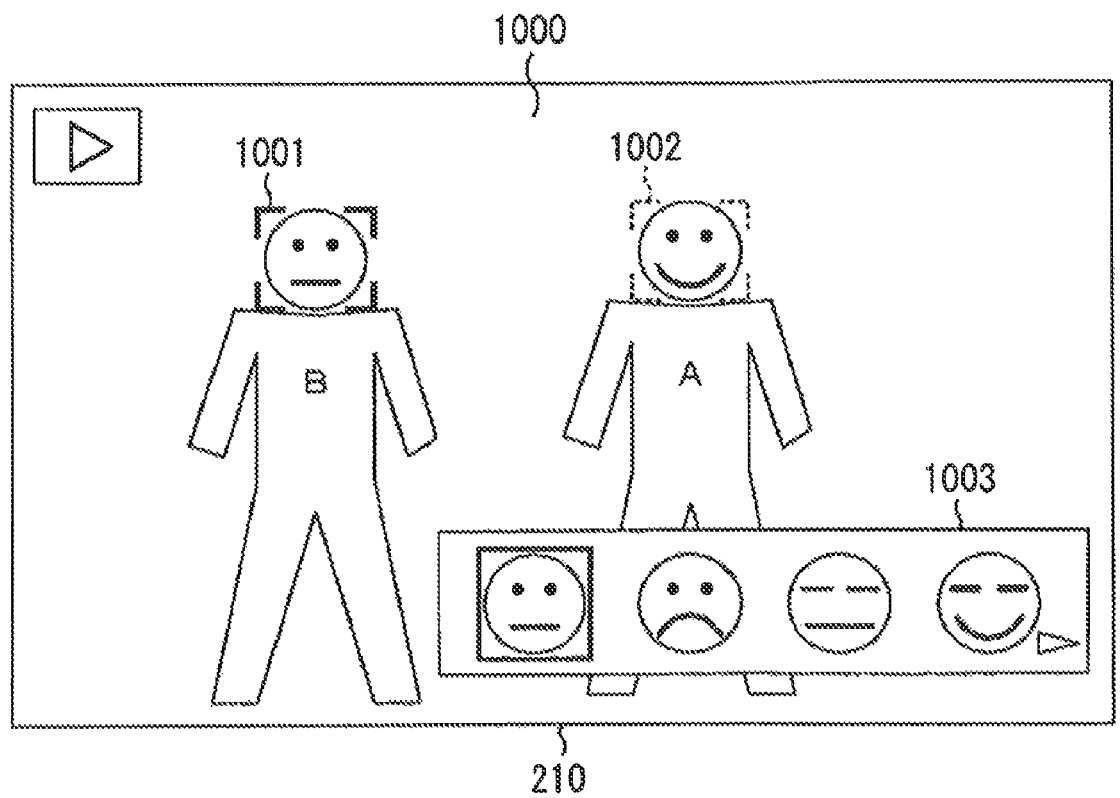
FIG. 10 is a diagram illustrating the screen display-after the transmission processing of the digital camera according to the exemplary embodiment of the present invention.
Figure 11:
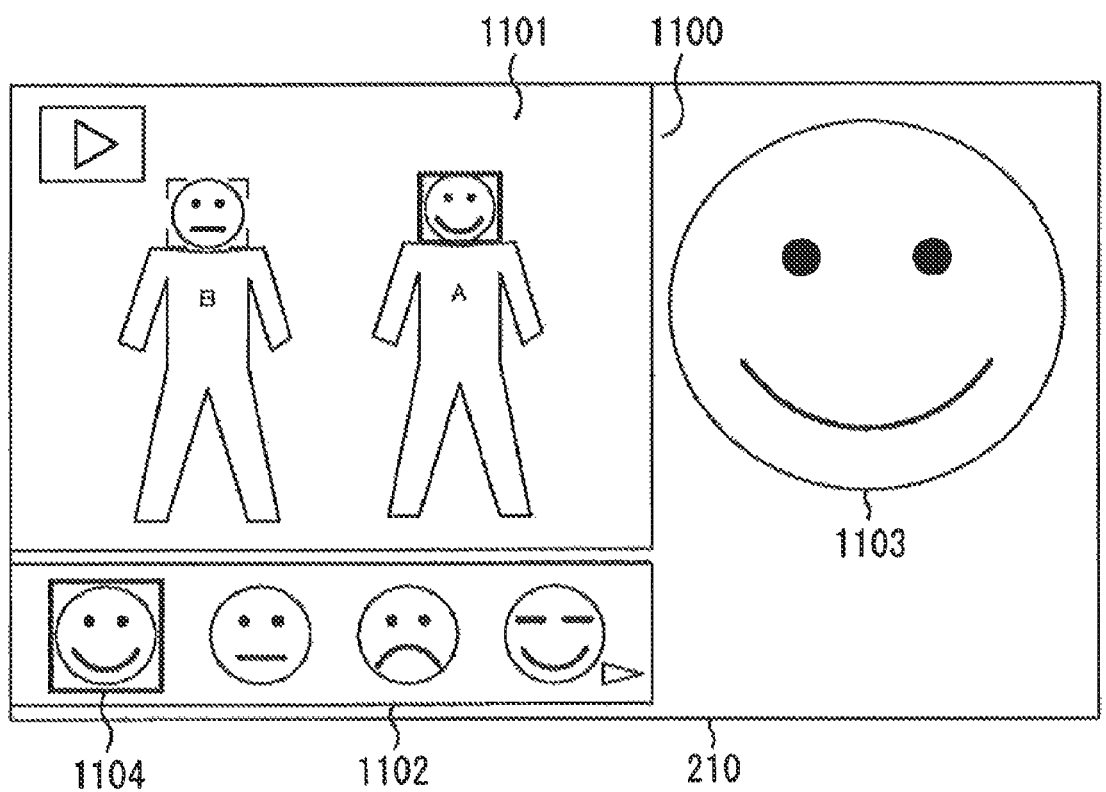
FIG. 11 is a diagram illustrating the screen display during transmission confirmation of the digital camera according to the exemplary embodiment of the present invention.

Returning to FIG. 4, if it is determined in step S418 or S422 that the event is the "transmission/reserved transmission" event (YES in step S418 or step S422), then in step S419, the control unit 106 first executes transmission processing. The details of the transmission processing will be described below using the flowchart of FIG. 6. After transmission processing in step S419, the move destination determination processing of step S420 and the image display-processing of step S421 are performed, so that an image 1000 illustrated in FIG. 10 is displayed on the display unit 210. Then, the processing returns to step S404 to perform the event acquisition again, Next, the details of the image display processing (steps S403, S409, and S421 of FIG. 4) will be described using the flowchart of FIG. 5.

Once the image display processing of step S501 is started, first, in step S502, the control unit 106 performs face collation of the selected face with face image data of the registration unit 111, and calculates similarity there between to pick up a plurality of face image candidates which have similarity equal to or higher than a predetermined threshold. As the face collation method, characteristic points (distance between eyes, positions of tine eyebrows, eyes, nose, and mouth, positions of the ears, etc.) are extracted from the selected face and each of the registered face images, compared, and a plurality of face image candidates, which have similarity equal to or higher than, a predetermined threshold, are picked up. It is noted that a method other than that described in the present exemplary embodiment can be employed as the face collation method.

Next, in step S503, the control unit 106 rearranges the candidates in increasing possibility that they are of the same person based on the result of the comparison in characteristic points. At this stage, the control unit 106 determines whether each face image is associated with another apparatus, which is currently connected (communication established) to the imaging apparatus, or whether each face image is associated with a device, for which transmission or reserved transmission has already been completed. Based on these results, the control unit 106 further rearranges or refines the candidates. The display order of the face candidates of step S503 will be described using FIGS. 19 to 21.

Figure 19:
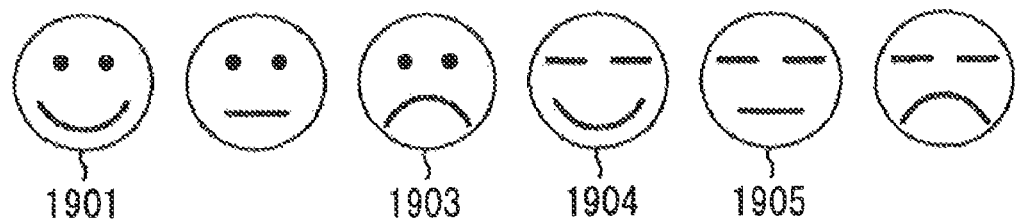
FIG. 19 is a diagram illustrating face image candidates in the small screen of the digital camera displayed in order of increasing similarity according to the exemplary embodiment of the present invention.
Figure 20:
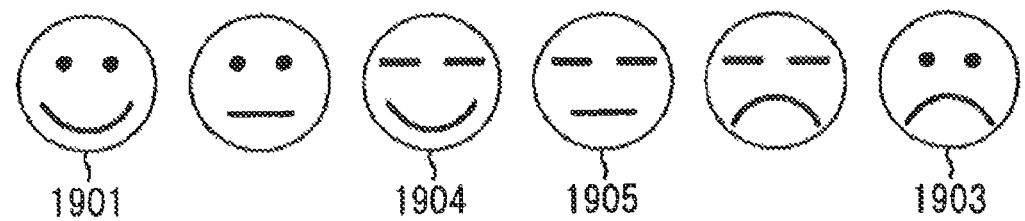
FIG. 20 is a diagram illustrating the face image candidates in the small screen of the digital camera rearranged based on FIG. 19 considering whether transmission or reserved transmission has been completed, according to the exemplary embodiment of the present invention.
Figure 21:
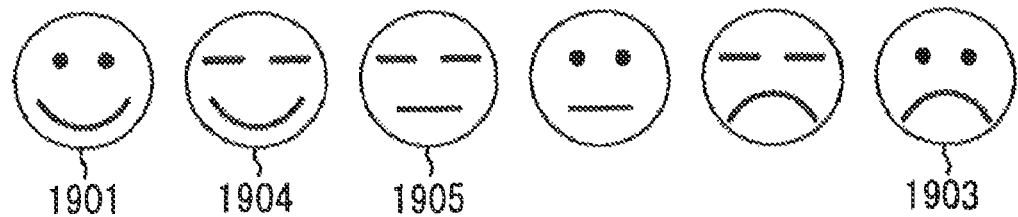
FIG. 21 is a diagram illustrating the face image candidates in the small screen of the digital camera rearranged based on FIG. 20 considering whether connection has been completed, according to the exemplary embodiment of the present invention.

FIG. 19 is a diagram illustrating face images rearranged from the left in order of increasing similarity based on the results in step S502. FIG. 20 is a diagram illustrating the results in which re arrangement was performed with the priority set at its lowest when transmission or reserved transmission of the face image 1903 illustrated in FIG. 19 has been completed. FIG. 21 is a diagram illustrating the results in which rearrangement was performed after the rearrangement of FIG. 20, with the priority set at its highest when connection of the face images 1901, 1904, and 1905 has been completed. That is, in step S503, the face images are rearranged in order of increasing similarity of the collation results while setting the priority of the face images for which transmission or reserved transmission has been completed to the lowest level and the priority of the face image data for which connection has been completed to the highest level. Further, the rearrangement of the image candidates can be performed based on the settings in the menu as to whether transmission or reserved transmission has been completed or whether connection has been completed. To realise the above-described processing, the digital camera 1 according to the present exemplary embodiment has a connection state detection unit, which detects the connection state with other apparatuses, and a transmission determination unit, which determines whether image data has been transmitted to the other apparatuses.

Returning to FIG. 5, in step S504, the control unit 106 determines whether transmission or reserved transmission has been completed. If transmission or reserved transmission has been completed (YES in step S504), in step S506, the face frame 1002 is displayed in dotted line illustrated in FIG. 10. On the other hand, if transmission or reserved transmission is not yet completed (NO in step S504), in step S505, the face frame 1001 is displayed in bold line, illustrated in FIG. 10, if the face frame is selected. Thus, by determining whether transmission or reserved transmission has been completed, and changing the display style of the face frame in the image data according to the determination result, the determination as to whether transmission or reserved transmission has been completed can be confirmed without a user's operation.

Next, in step S507, the control unit 106 detects whether connection has been completed. If connection has been completed (YES in step S507), in step S508, the color of the face frame is changed. On the other hand, if the connection is not yet completed (NO in step S507), the color of the face frame is not changed, and in step S509, a small screen 903 illustrated in FIG. 9 is displayed. Then, the processing is finished in step S510. Thus, by changing the display style of the face frame or by turning on the LED of a user-operation button based on the detection results of whether connection of a face image has been completed, the determination as to whether connection has been completed can be confirmed without a user's operation.

FIG. 10 illustrates an image in which the face frame 1601 illustrated in FIG. 16 has been selected and transmitted. In FIG. 10, the face, frame of the transmitted (including reserved transmission) face candidate is displayed in dotted line, and the face frame 1001 which is selected, next is displayed in bold line, or in other words, the selection has been replaced. Further, although the face frame for which transmission has been completed is displayed in dotted line, the color of the face frame display may be changed or the color inside the face frame can be changed. Further, in the small screen 1003, the face image selected by the face frame 1601 illustrated in FIG. 16 is excluded in the list of face image candidates displayed.

Further, when, it is detected that a new digital camera has connected to the network to which the digital camera 1 is connected, or when a digital camera which is connected is disconnected from the network, the processing illustrated in FIG. 5 is performed again. In this manner, the face images in the small screen 1003 illustrated in FIG. 9 are constantly kept updated to the most recent state.

Figure 6:
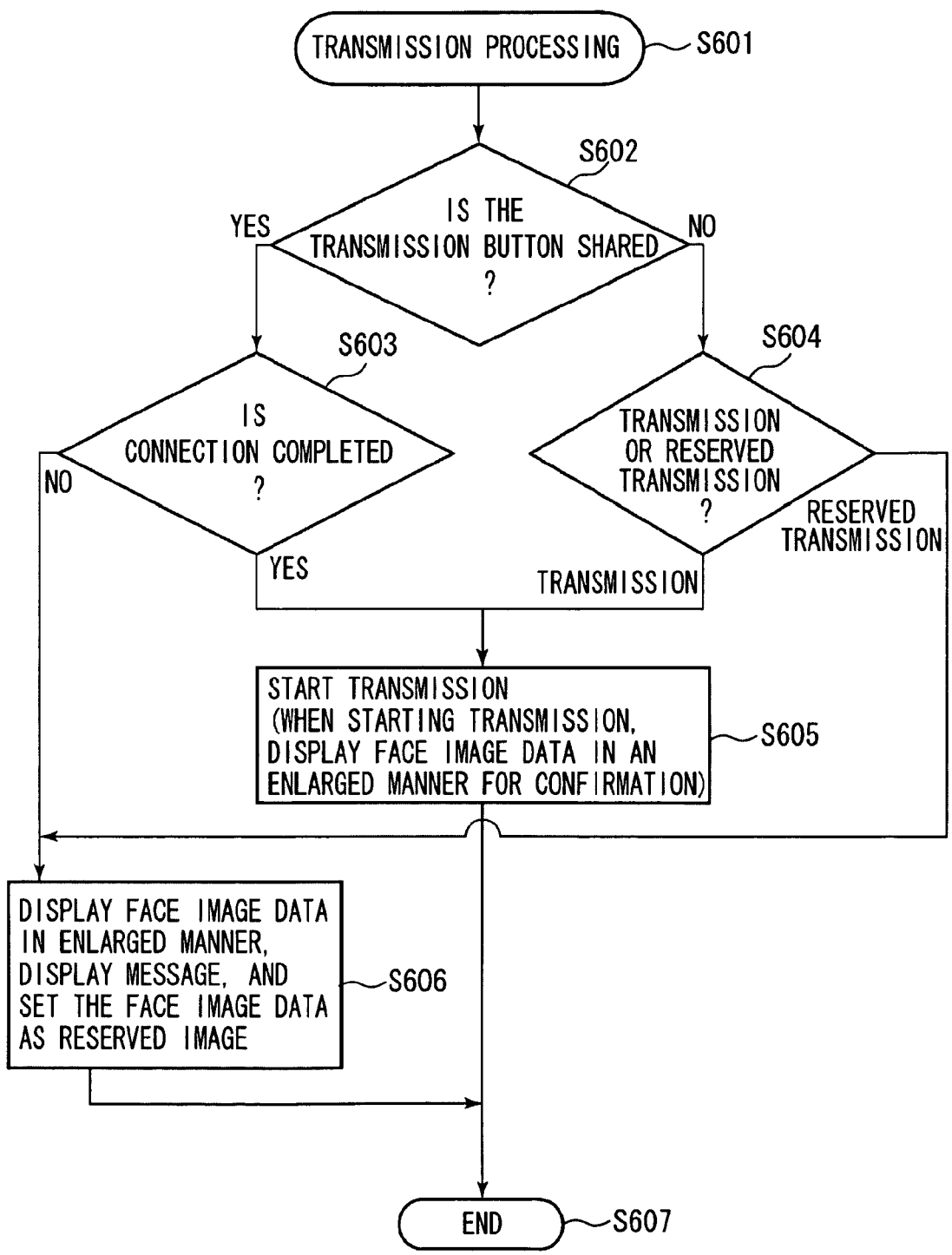
FIG. 6 is a flowchart illustrating transmission processing of the digital camera according to the exemplary embodiment of the present invention.

Next, the details of the transmission processing (step S419 of FIG. 4) will be described using the flowchart of FIG. 6. Here, the digital camera 1 according to the present exemplary embodiment, has immediate transmission and reserved transmission as functions for transmitting the images. The details will now be described according to the flowchart.

Once the transmission processing is started in step S601, first, in step S602, the control unit 106 determines whether a single transmission button is shared for the immediate transmission and reserved transmission. Whether to have the shared transmission button can be set in the menu etc.

If it is determined in step S602 that the transmission button is shared (YES in step S602), in step S603, the control unit 106 determines whether the communication has been connected. If the connection with the transmission destination apparatus has been completed (YES in step S603), in step S605, the control unit 106 starts transmission. Then, for transmission confirmation, an image 1101 to be transmitted is displayed in a scaled down manner like the image 1100 illustrated in FIG. 11. The small screen 1102 is displayed below the image 1101 and the face image 1104 is displayed to the side in an enlarged manner (1103). After displaying in an enlarged manner, transmission of the image is started. At this stage, the transmission can be started by displaying a message inquiring whether to start transmission and then pressing down the SET button 212.

Next, if it is determined by the connection completion determination of step S603 that the transmission destination apparatus is not connected (NO in step S603), in step S606, the control unit 106 enlarges the face image in the same manner as during transmission, displays a message, sets the face image data as the reserved image, and finishes the processing in step S607.

On the other hand, if it is determined that the transmission button is not shared (NO in step S602), in step S604, the control unit 106 determines whether the designated processing is a transmission or a reserved transmission. In the present, exemplary embodiment, the PS button 211 is used as the transmission button, and the MENU button 218 is used as the reserved transmission button. If the PS button 211 is pressed down (TRANSMISSION in step S604), in step S605, the face image is enlarged and transmission is performed, and then the processing is finished in step S607. Further, if the MENU button 218 is pressed down (RESERVED TRANSMISSION in step S604), in step S606, the face image is enlarged, a message is displayed, the face image data is set as the reserved image, and then the processing is finished in step S607. In addition, in the case of reserved transmission, image data is transmitted collectively immediately after connection is established.

Figure 7:
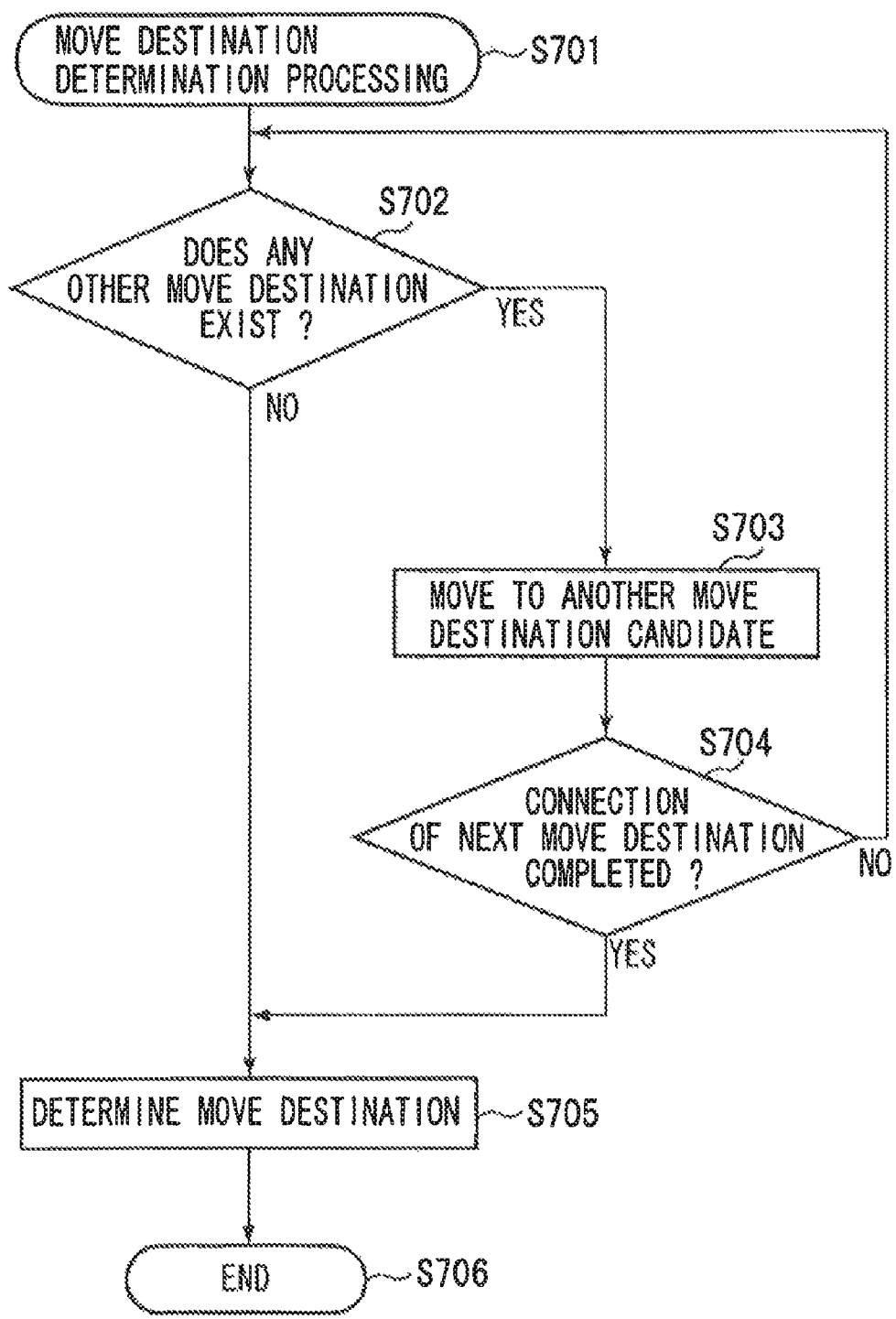
FIG. 7 is a flowchart illustrating move destination determination processing of the digital camera according to the exemplary embodiment of the present invention.

Next, the details of the move destination determination processing (step S420 of FIG. 4) will be described using the flowchart of FIG. 7.

Once the move destination determination processing is started in seep S701, first, in step S702, the control unit 106 determines whether there is a detected face other than the currently selected face, or in other words, whether there is another move destination (selection destination). If there is (YES in step S702), the processing proceeds to step S703, and if there is not (NO in step S702), the processing proceeds to step S705.

In step S703, the control unit 106 moves to another move destination, and in step S704, determines whether the connection of the next move destination is completed. If it is determined in the determination processing of step S704 that the connection of the next move destination has not been completed (NO in step S704), the determination of step S702 as to whether there is another move destination is performed again. If the connection of the next move destination is completed (YES in step S704), in step S705, the move destination is determined, and the processing is finished in step S706. Further, if it is determined in step S702 that there is no other move destination (NO in step S702), in step S705, the current position is determined as the move destination, and the processing is finished in step S706.

Figure 8:
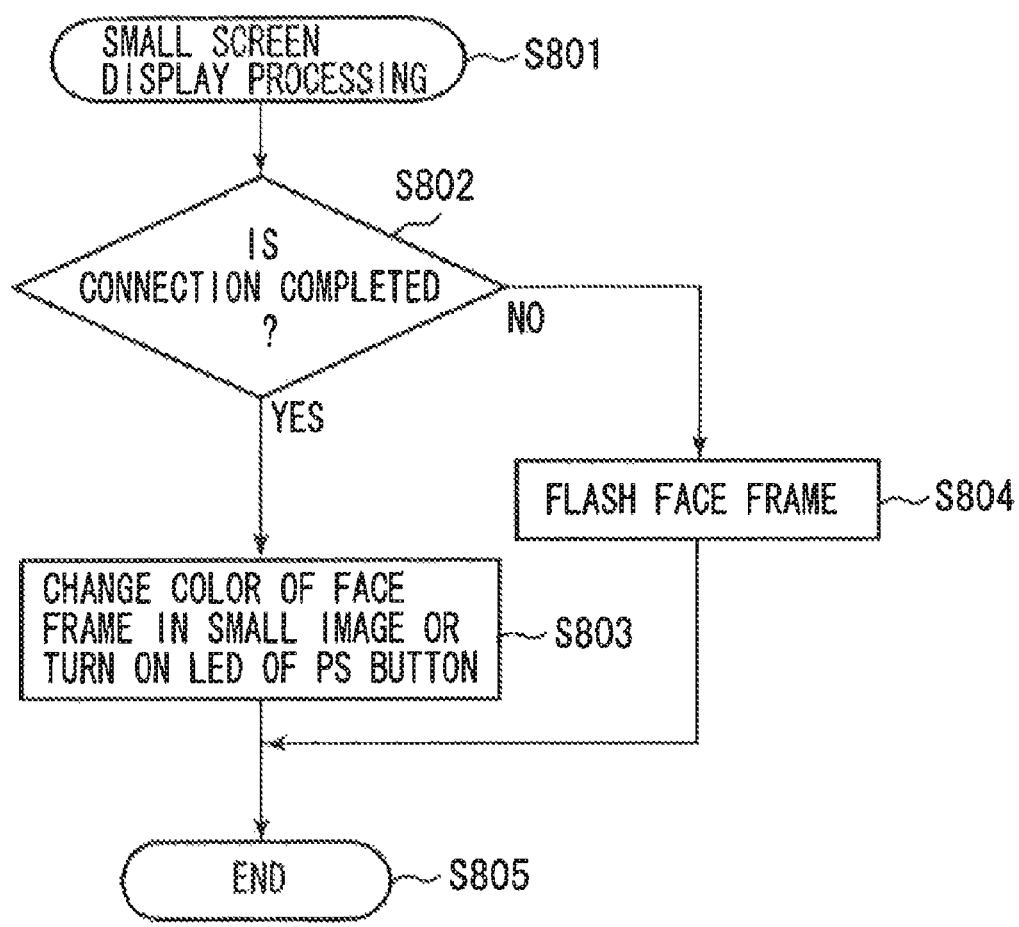
FIG. 8 is a flowchart illustrating small screen display processing of the digital camera according to the exemplary embodiment of the present invention.

Next, the details of the small screen display processing will be described using the flowchart of FIG. 8.

Once the small screen display processing is started in step S801, first, in step S802, the control unit 106 determines whether connection of the selected face image has been completed. If it has been completed (YES in step S802), in step S803, the control unit 106 changes the color of the face frame in the small screen or turns on the LED in the PS button 211, and finishes the small screen display processing in step S805. If connection of the selected face image has not been completed (NO in step S802), in step S804, the control unit 106 flashes the face frame in the small screen, and finishes the small screen display processing in step S805.

Thus, in the digital camera 1 according to the present exemplary embodiment, a target (face) in the image data is detected, registered face images relating to the detected face are displayed on the same screen as the image data, and a transmission destination for that image data can be selected from the displayed face images. Further, the transmission destination is determined by a user from the selected face image, and the image data can be transmitted via wireless communication and the like. If there is a plurality of detected faces, selectable frames are displayed around the image data, and the registered face images for the selected, face are displayed. Thereby, a user interface can be provided, which allows easy confirmation of the transmission destination, so that especially transmission of image data to a wrong apparatus can be avoided. In addition, while in the present exemplary embodiment face images are displayed as transmission destination candidates, in addition to the face images, other identification information of the person (name etc.) can also be simultaneously displayed.

Further, by allowing a plurality of registered face images relating to the detected face to be displayed in order of increasing collation as transmission destination candidates and to be selected, the number of user operations can be reduced, and the possibility of a mistaken transmission to a wrong apparatus can be avoided even if a mistake was made in the collation results.

Further, during transmission, after the selection of the transmission destination from the image data, in which the transmission destination candidates are displayed, by displaying the face image in an enlarged manner on the same screen, the determination of the transmission destination can be performed more accurately.

Further, the present exemplary embodiment is configured so that when not all of the face image candidates can be displayed on the same screen as the image data, the face images are displayed in a scrollable manner which allows their display to be switched. Thereby, confirmation of all of the candidate face images can be performed. As a result, usability can be improved.

Further, after the transmission of image data based on one face where two or more selectable faces were detected in the image data, the next face is automatically selected. In addition, the registered face images corresponding to that face are displayed. As a result, the number of user's operations can be reduced, and usability can be improved.

Further, since the digital camera 1 according to the present exemplary embodiment has both an immediate transmission function and a reserved transmission function of the image data, usability is improved. In addition, usability is improved, as a result of reducing the number of user's operations by determining whether the connection of the transmission destination digital camera has been completed (transmission establishment completed), and automatically performing immediate transmission and reserved transmission. Further, a user interface with a high usability can be provided, and usability of the digital camera, can be improved, by enabling the operations during immediate transmission and reserved transmission to be performed in a similar operation (in other words, also providing a function for separating the user's operations of immediate transmission and reserved transmission).

Further, when the transmission destination face image candidates are displayed, in addition to a high collation accuracy, the face image candidates are rearranged or refined by considering whether the communication connection with the other apparatuses has currently been completed, and whether the transmission (including reserved transmission) of the image data has already been completed. As a result, the transmission destination candidates can automatically be refined, which allows the number of user's operations to be reduced, thereby improving usability.

Further, by determining whether the connection of the face image selected among the face image candidates is completed, and by changing the face frame display or turning on an LED of the user-operation, buttons, the determination as to whether the connection has been completed can be confirmed without a user's operation.

Further, since the selection of the face frame display in the image data is performed by determining whether the connection is completed so that the face frame can be moved by giving preference to the completed connections, the number of user's operations can be reduced, which improves usability.

Further, usability is improved by changing the display method (display style) of the face frame in the image data based, on whether transmission (including reserved transmission) has been completed or whether connection has been completed, and by allowing the determination as to whether the connection has been completed to be confirmed without a user's operation.

Further, in the digital camera 1 according to the present exemplary embodiment, face image data from another apparatus can be acquired and associated with the device information of the other apparatus registered in the registration unit 111. As a result, the collation accuracy of the face image data can be increased. Further, by displaying the acquired face image data in the image data, the possibility of transmitting to the wrong party can be avoided. The face image data for use in face collation does not need to be registered during registration, which allows the number of user's operations to be reduced, In addition, though the plurality of face images are arranged in order of the increasing priority as illustrated in FIG. 19 to FIG. 21, it is not limited to this exemplary embodiment. For example, only face images having a high priority can be displayed, while face images having a low priority cannot be displayed. Furthermore, a face frame can be displayed around a face image having a high priority, which is different from a face frame having a low priority.

To realize the present invention, a recording medium, on which the program code of a software program (computer program) for realizing the functions of the above-described present exemplary embodiment is stored, can also be used. In the case, the present invention is achieved by supplying the recording medium to a system or an apparatus, and by having a computer (or a central processing unit or micro processing unit) in that system or apparatus read and execute the program code stored in the recording medium.

In this case, the program code itself, which is read from a recording medium, realizes the function of the above-described exemplary embodiment, so that the program code itself and the recording medium, on which the program code is stored, constitute the present invention.

Examples of the recording medium for supplying the program code include floppy disks, hard disks, optical disks, magneto-optical disks, compact disc-read-only memory (CD-ROM), compact disc-recordable (CD-R), magnetic tapes, non-volatile memory cards, read-only memory (ROM) and the like.

Further, the present invention also includes oases where the operating system (OS) or the basic system, which is running on the computer, performs all or part of the actual processing according to an instruction of that program code.

In addition, the program code, which is read from the recording medium, can be written into a memory which is provided on a function expansion board inserted into a computer or a function expansion unit connected to the computer. In such case, based on an instruction from that program, a CPU, provided on that function expansion board or function expansion unit, can perform ail or part of the actual processing.

While the present invention has been described with reference to exemplary embodiments, it is to be understood that the invention is not limited to the disclosed, exemplary embodiments. The scope of the following claims is to be accorded the broadest interpretation so as to encompass all modifications, equivalent, structures, and functions.

What is claimed is:

1. An imaging apparatus having an imaging unit configured to obtain image data by capturing an object image including at least one target, a display unit configured to display the image data obtained by the imaging unit, and a communication unit configured to be capable of communicating with a plurality of external apparatuses, the imaging apparatus comprising:

a storing unit configured to store person identification information while associating the person identification information with information relating to an external apparatus, wherein the person identification information includes information related to face image data;

a collation unit configured to collate a target detected from the image data with the person identification information;

a detection unit configured to detect an external apparatus that is communicating with the imaging apparatus via the communication unit; and a display control unit configured to display a plurality of pieces of representation data corresponding to the person identification information on the display unit each as a candidate of a transmission destination of the image data in an order based on a result of collation by the collation unit, wherein the display control unit is configured to display representation data corresponding to the person identification information, which is associated with the external apparatus, in a different style depending on whether the external apparatus is determined by the detection unit to be communicating with the imaging apparatus or not to be communicating therewith.

2. The imaging apparatus according to claim 1, further comprising a first selection unit configured to select a piece of representation data corresponding to the person identification information from among the plurality of pieces of representation data corresponding to the person identification information displayed on the display unit, wherein the communication unit is configured to transmit the image data to an external apparatus that is associated with the selected piece of representation data selected by the first selection unit.

3. The imaging apparatus according to claim 2, further comprising a reservation unit configured to reserve transmission of the image data when the external apparatus associated with the piece of representation data selected by the first selection unit is not communicating with the imaging apparatus via the communication unit.

4. The imaging apparatus according to claim 1, wherein the display control unit is configured to preferentially display at least one piece of representation data corresponding to the person identification information, which is associated with an external apparatus determined by the detection unit to be communicating with the imaging apparatus.

5. The imaging apparatus according to claim 1, wherein the collation unit is configured to determine the similarity between a target in the image data and the person identification information, and wherein the display control unit is configured to preferentially display at least one piece of representation data corresponding to person identification information the similarity of which is determined to be higher than a predetermined value.

6. The imaging apparatus according to claim 1, further comprising a second selection unit configured to select a target from among targets in the image data, wherein the collation unit is configured to collate the target selected by the second selection unit with the person identification information.

7. The imaging apparatus according to claim 1, wherein the display control unit is configured to display an index, which is superimposed on the image data, indicating that a target in the image data is detected, and wherein the display control unit is configured to change a display style of the index based on a result of detection by the detection unit.

8. The imaging apparatus according to claim 1, wherein the display control unit is configured to display representation data corresponding to person identification information, which is associated with an external apparatus, in a different style depending on whether the external apparatus is determined by the detection unit to be communicating with the imaging apparatus or not to be communicating therewith.

9. The imaging apparatus according to claim 1, wherein the display control unit is configured to preferentially display representation data corresponding to person identification information, which is associated with an external apparatus to which the image data has not been transmitted.

10. The imaging apparatus according to claim 1, wherein the display control unit is configured to display the plurality of pieces of representation data corresponding to the person identification information on the display unit again in an order based on a result of detection by the detection unit when communication with the external apparatus communicating with the imaging apparatus is detected to have been disconnected, or when a new external apparatus is detected to be communicating with the imaging apparatus.

11. An imaging apparatus having an imaging unit configured to obtain image data by capturing an object image including at least one target, a display unit configured to display the image data obtained by the imaging unit, and a communication unit configured to be capable of communicating with a plurality of external apparatuses, the imaging apparatus comprising:

a storing unit configured to store person identification information while associating the person identification information with information relating to an external apparatus, wherein the person identification information includes information related to face image data;

a collation unit configured to collate a target detected from the image data with the person identification information;

a detection unit configured to detect an external apparatus that is communicating with the imaging apparatus via the communication unit; and a display control unit configured to display a plurality of pieces of representation data corresponding to the person identification information on the display unit each as a candidate of a transmission destination of the image data, wherein the display control unit causes the display unit to display the plurality of pieces of the representation data corresponding to the person identification information differently in appearance, based on a result of collation by the collation unit.

12. The imaging apparatus according to claim 11, further comprising a first selection unit configured to select a piece of representation data corresponding to the person identification information from among the plurality of pieces of representation data corresponding to the person identification information displayed on the display unit, wherein the communication unit is configured to transmit the image data to an external apparatus that is associated with the piece of representation data selected by the first selection unit.

13. The imaging apparatus according to claim 12, further comprising a reservation unit configured to reserve transmission of the image data when the external apparatus associated with the piece of representation data selected by the first selection unit is not communicating with the imaging apparatus via the communication unit.

14. The imaging apparatus according to claim 11, wherein the display control unit is configured to display at least one piece of representation data corresponding to the person identification information, which is related to the external apparatus that is determined to be communicating with the imaging apparatus, differently in appearance from at least one piece of representation data corresponding to the person identification information, which is related to the external apparatus that is determined not to be communicating with the imaging apparatus.

15. The imaging apparatus according to claim 11, wherein the collation unit is configured to determine the similarity between a target in the image data and the person identification information.

16. The imaging apparatus according to claim 11, further comprising a second selection unit configured to select a target from among targets in the image data, wherein the collation unit is configured to collate the target selected by the second selection unit with the person identification information.

17. The imaging apparatus according to claim 11, wherein the display control unit is configured to display an index, which is superimposed on the image data, indicating that a target in the image data is detected, and wherein the display control unit is configured to change a display style of the index based on a result of detection by the detection unit.

18. The imaging apparatus according to claim 11, wherein the display control unit is configured to preferentially display representation data corresponding to person identification information associated with an external apparatus to which the image data has not been transmitted.

19. The imaging apparatus according to claim 11, wherein the display control unit is configured to display the plurality of pieces of representation data corresponding to the person identification information differently in appearance, based on the result of collation by the collation unit and a result of detection by the detection unit.

20. An imaging apparatus having an imaging unit configured to obtain image data by capturing an object image including at least one target, a display unit configured to display the image data obtained by the imaging unit, and a communication unit configured to be capable of communicating with a plurality of external apparatuses, the imaging apparatus comprising:

a storing unit configured to store person identification information while associating the person identification information with information relating to an external apparatus, wherein the person identification information includes information related to face image data;

a collation unit configured to collate a target detected from the image data with the person identification information;

a detection unit configured to detect an external apparatus that is communicating with the imaging apparatus via the communication unit; and a display control unit configured to display a plurality of pieces of representation data corresponding to the person identification information on the display unit each as a candidate of a transmission destination of the image data, based on a result of collation by the collation unit.

21. The imaging apparatus according to claim 20, wherein the display control unit is configured to display the plurality of pieces of representation data corresponding to the person identification information on the display unit each as the candidate of the transmission destination of the image data, based on the result of collation by the collation unit and a result of detection by the detection unit.

22. A method for controlling an imaging apparatus including an imaging unit configured to obtain image data by capturing an object image including at least one target, a display unit configured to display the image data obtained by the imaging unit, and a communication unit configured to communicate with a plurality of external apparatuses, the method comprising:

storing person identification information while associating the person identification information with information relating to the external apparatuses, wherein the person identification information includes information related to face image data;

collating a target in the image data with the person identification information;

detecting an external apparatus that is communicating with the imaging apparatus; and displaying a plurality of pieces of representation data corresponding to the person identification information each as a transmission destination candidate of the image data in an order based on a result of the collation.

23. A method for controlling an imaging apparatus including an imaging unit configured to obtain image data by capturing an object image including at least one target, a display unit configured to display the image data obtained by the imaging unit, and a communication unit configured to communicate with a plurality of external apparatuses, the method comprising:

storing person identification information while associating the person identification information with information relating to the external apparatuses, wherein the person identification information includes information related to face image data;

collating a target in the image data with the person identification information;

detecting an external apparatus that is communicating with the imaging apparatus; and displaying a plurality of pieces of representation data corresponding to the person identification information each as a candidate of a transmission destination of the image data, wherein the display unit displays the plurality of pieces of representation data corresponding to the person identification information differently in appearance, based on a result of the collation and a result of the detection.

24. A method for controlling an imaging apparatus including an imaging unit configured to obtain image data by capturing an object image including at least one target, a display unit configured to display the image data obtained by the imaging unit, and a communication unit configured to communicate with a plurality of external apparatuses, the method comprising:

storing person identification information while associating the person identification information with information relating to the external apparatuses, wherein the person identification information includes information related to face image data;

collating a target in the image data with the person identification information;

detecting an external apparatus that is communicating with the imaging apparatus; and displaying a plurality of pieces of representation data corresponding to the person identification information each as a candidate of a transmission destination of the image data, based on a result of the collation.

25. A computer-readable storage medium containing computer-executable instructions for controlling an imaging apparatus including an imaging unit configured to obtain image data by capturing an object image including at least one target, a display unit configured to display the image data obtained by the imaging unit, and a communication unit configured to communicate with a plurality of external apparatuses, the medium comprising:

computer-executable instructions for storing person identification information while associating the person identification information with information relating to the external apparatuses, wherein the person identification information includes information related to face image data;

computer-executable instructions for collating a target in the image data with the person identification information;

computer-executable instructions for detecting an external apparatus that is communicating with the imaging apparatus; and computer-executable instructions for displaying a plurality of pieces of representation data corresponding to the person identification information each as a transmission destination candidate of the image data in an order based on a result of the collation.

26. A computer-readable storage medium containing computer-executable instructions for controlling an imaging apparatus including an imaging unit configured to obtain image data by capturing an object image including at least one target, a display unit configured to display the image data obtained by the imaging unit, and a communication unit configured to communicate with a plurality of external apparatuses, the computer-executable instructions comprising:

computer-executable instructions for storing person identification information while associating the person identification information with information relating to the external apparatuses, wherein the person identification information includes information related to face image data;

computer-executable instructions for collating a target in the image data with the person identification information;

computer-executable instructions for detecting an external apparatus that is communicating with the imaging apparatus; and computer-executable instructions for displaying a plurality of pieces of representation data corresponding to the person identification information each as a candidate of a transmission destination of the image data, wherein the display unit displays the plurality of pieces of representation data corresponding to the person identification information differently in appearance, based on a result of the collation and a result of the detection.

27. A computer-readable storage medium containing computer-executable instructions for controlling an imaging apparatus including an imaging unit configured to obtain image data by capturing an object image including at least one target, a display unit configured to display the image data obtained by the imaging unit, and a communication unit configured to communicate with a plurality of external apparatuses, the computer-executable instructions comprising:

computer-executable instructions for storing person identification information while associating the person identification information with information relating to the external apparatuses, wherein the person identification information includes information related to face image data;

computer-executable instructions for collating a target in the image data with the person identification information;

computer-executable instructions for detecting an external apparatus that is communicating with the imaging apparatus; and displaying a plurality of pieces of representation data corresponding to the person identification information each as a candidate of a transmission destination of the image data, based on a result of the collation.

* * * * *